(12) United States Patent
Taguchi et al.

(10) Patent No.: US 10,717,453 B2
(45) Date of Patent: Jul. 21, 2020

(54) RAILWAY VEHICLE DISC BRAKE APPARATUS

(71) Applicant: NABTESCO CORPORATION, Tokyo (JP)

(72) Inventors: Akira Taguchi, Kobe (JP); Tadashi Yoshimura, Kobe (JP)

(73) Assignee: Nabtesco Corporation, Tokyo (JP)

( * ) Notice: Subject to any disclaimer, the term of this patent is extended or adjusted under 35 U.S.C. 154(b) by 0 days.

(21) Appl. No.: 14/655,496

(22) PCT Filed: Dec. 19, 2013

(86) PCT No.: PCT/JP2013/084113
§ 371 (c)(1),
(2) Date: Jun. 25, 2015

(87) PCT Pub. No.: WO2014/103883
PCT Pub. Date: Jul. 3, 2014

(65) Prior Publication Data
US 2015/0353107 A1 Dec. 10, 2015

(30) Foreign Application Priority Data
Dec. 26, 2012 (JP) ................................ 2012-283453

(51) Int. Cl.
*F16D 65/18* (2006.01)
*B61H 5/00* (2006.01)
(Continued)

(52) U.S. Cl.
CPC .......... *B61H 5/00* (2013.01); *F16D 55/2245* (2013.01); *F16D 65/095* (2013.01); *F16D 65/18* (2013.01);
(Continued)

(58) Field of Classification Search
CPC ......... F16D 55/2245; F16D 2055/0008; F16D 2055/0016; F16D 2121/04; F16D 65/18;
(Continued)

(56) References Cited

U.S. PATENT DOCUMENTS 3,507,364 A * 4/1970 Tompkin ................. B61H 5/00
188/59
4,018,140 A * 4/1977 Engle ....................... B61H 5/00
188/170
(Continued)

FOREIGN PATENT DOCUMENTS

CN      102119287 A    7/2011
DE      1 040 065 B    10/1958
(Continued)

OTHER PUBLICATIONS

Machine Translation of JP-200575129A (Year: 2005).*
(Continued)

*Primary Examiner* — Melody M Burch
(74) *Attorney, Agent, or Firm* — Pillsbury Winthrop Shaw Pittman, LLP

(57) ABSTRACT

Provided is a railway vehicle disc brake apparatus that is capable of ensuring sufficient strength to withstand a reaction force from a disc, and that can be reduced in weight. A caliper lever of the railway vehicle disc brake apparatus has a pair of working point side arms, and a working point section. The working point section links the pair of working point side arms, and holds a pad via a working point shaft. The pair of working point side arms are inclined in such a manner that the interval therebetween narrows as the working point side arms approach the working point section. Furthermore, each working point side arm is inclined with respect to a reference plane that is perpendicular to the direction in which the working point section extends.

10 Claims, 15 Drawing Sheets

(51) Int. Cl.
*F16D 55/224* (2006.01)
*F16D 65/095* (2006.01)
*F16D 121/04* (2012.01)
*F16D 125/64* (2012.01)
*F16D 121/08* (2012.01)

(52) U.S. Cl.
CPC ...... *F16D 2121/04* (2013.01); *F16D 2121/08* (2013.01); *F16D 2125/64* (2013.01)

(58) Field of Classification Search
CPC ..... F16D 65/095; F16D 2125/64; B61H 5/00; B62H 5/00
See application file for complete search history.

(56) References Cited

U.S. PATENT DOCUMENTS

| 4,527,666 | A* | 7/1985 | Emilsson | B61H 5/00 188/198 |
| 2008/0000731 | A1* | 1/2008 | Dewberry | F16D 55/2245 188/72.7 |
| 2009/0229930 | A1* | 9/2009 | Emilsson | F16D 55/2245 188/58 |
| 2012/0285040 | A1* | 11/2012 | Sievers | A43B 13/183 36/27 |
| 2014/0345982 | A1* | 11/2014 | Suzuki | B61H 5/00 188/71.6 |

FOREIGN PATENT DOCUMENTS

| EP | 0 091 151 A1 | 10/1983 |
| GB | 786090 | 11/1957 |
| JP | 6-82442 U | 11/1994 |
| JP | 2005-024054 A | 1/2005 |
| JP | 2005-075129 A | 3/2005 |
| JP | 200575129 A * | 3/2005 |
| JP | 2006-315422 A | 11/2006 |
| WO | WO 2009/144863 A1 | 12/2009 |

OTHER PUBLICATIONS

International Preliminary Report on Patentability and the Written Opinion of the International Searching Authority as issued in International Patent Application No. PCT/JP2013/084113, dated Jun. 30, 2015,.
International Search Report as issued in International Patent Application No. PCT/JP2013/084113, dated Apr. 1, 2014.
First Office Action as issued in Chinese Patent Application No. 201380067895.4, dated Jul. 15, 2016.

* cited by examiner

RAILWAY VEHICLE DISC BRAKE APPARATUS

CROSS-REFERENCE TO RELATED APPLICATIONS

This application is the U.S. National Stage of PCT/JP2013/084113, filed Dec. 19, 2013, which in turn claims priority to Japanese Patent Application No. JP 2012-283453, filed Dec. 26, 2012. The contents of these applications are incorporated herein by reference in their entireties.

TECHNICAL FIELD

The present invention relates to a disc brake apparatus for a railway vehicle.

BACKGROUND ART

A known disc brake apparatus for a railway vehicle is configured to use the principle of leverage (e.g., refer to patent document 1). Patent document 1 describes a disc brake apparatus that includes a pair of brake heads, a pair of caliper levers, and an actuator.

The brake heads are located at opposite sides of a wheel and hold pair of brake pads. The brake heads are coupled to the caliper levers. Each caliper lever is pivotal about a fulcrum pin extending in a generally vertical direction. Each caliper lever is connected to the actuator. The actuator drives each caliper lever so that the caliper lever pivots about the fulcrum shaft. This structure rotates the caliper levers. Consequently, the brake pads, which are held by the brake heads on the caliper levers, contact a disc and apply a braking force to the disc.

Patent Document 1: Japanese Laid-Open Patent Publication No. 2006-315422 ("abstract")

SUMMARY OF THE INVENTION

A lighter railway vehicle consumes less energy when the railway vehicle travels. Thus, there is a demand for a railway vehicle disc brake apparatus that is further reduced in weight. The caliper levers receive a large reaction force from the disc when applying the brakes on the railway vehicle. Thus, the caliper levers are shaped to be thick to have sufficient strength. This increases the weight of the caliper levers. For example, patent document 1 describes a caliper lever that includes a portion extending from the fulcrum pin to the brake head. The portion of the caliper lever has the form of a large tetragon as viewed from beside.

Accordingly, it is an object of the present invention to provide a railway vehicle disc brake apparatus that is reduced in weight and has strength sufficient to withstand a reaction force from a disc.

(1) To solve the above problem, one aspect of the present invention is a railway vehicle disc brake apparatus that includes a caliper lever and a drive device. The caliper lever is configured to be pivotal about a predetermined fulcrum shaft so that a pad is movable in a direction extending toward a disc and in a direction extending away from the disc. The drive device drives the caliper lever about the fulcrum shaft. The caliper lever includes an effort-side arm, a fulcrum portion, two load-side arms, and a load portion. The effort-side arm is coupled to the drive device. The fulcrum portion extends from the effort-side arm and is coupled to the fulcrum shaft. The two load-side arms extend from the fulcrum portion. The load portion connects the two load-side arms to each other and holds the pad with a predetermined load shaft. The two load-side arms are inclined so that a distance between the two load-side arms decreases as the load portion becomes closer. Each of the load-side arms is inclined relative to a reference plane that is orthogonal to a direction in which the load portion extends.

In this structure, the two load-side arms are inclined so that the distance between the load-side arms decreases as the load portion becomes closer. Additionally, the load-side arms are each inclined relative to the reference plane. In such a structure, when applying the brakes on the railway vehicle, a reaction force, which acts on the pad from the disc in the direction in which the disc rotates, acts in a generally even manner on the load-side arms through the load shaft and the load portion. This limits stress concentration on the load-side arms and the load portion. Thus, the peak of stress on the load-side arms and the load portion is low. Consequently, each of the load-side arms has strength sufficient to withstand the reaction force from the disc. Furthermore, the caliper lever has sufficient strength. Additionally, since the stress, which is generated in the load-side arms when applying the brakes on the railway vehicle, has a low peak, the load-side arms may each be shaped in a further slim form. Such a weight reduction of the load-side arms reduces the weight of the caliper lever.

This provides a railway vehicle disc brake apparatus that is reduced in weight and has strength sufficient to withstand a reaction force from a disc.

(2) Preferably, the caliper lever includes an opening surrounded by the two load-side arms and the load portion, and an edge defining the opening around the load portion includes a curved portion.

In this structure, parts connecting the load-side arms and the load portion may be smoothly formed, which limits stress concentration. This further reduces a load on each of the load-side arms.

(3) More preferably, the two load-side arms respectively include two inward surfaces opposed to each other. The two inward surfaces respectively include two arcs arranged so that a distance between the two arcs decreases as the load portion becomes closer.

In this structure, the parts connecting the load-side arms and the load portion may be smoothly formed, which further limits stress concentration.

(4) Further preferably, the inward surfaces further respectively include flat portions that extend from the arcs toward the fulcrum portion.

In this structure, each load-side arm may be further increased in overall length. This increases the flexibility of the load-side arm. Thus, an excessive load acting on the load-side arms may be limited in a further assured manner.

(5) Preferably, the caliper lever includes an opening surrounded by the two load-side arms and the load portion, and the opening is shaped to be triangular and tapered toward the load portion.

In this configuration, the fulcrum shaft, the two load-side arms, and the load portion form a triangular truss structure. This further increases the rigidity of the load-side arms. For example, when the reaction force, which acts on the pad from the disc in the direction the disc rotates, is transmitted to the load-side arms, deformations of the load-side arms may be limited. This limits stress concentration resulting from such deformations of the load-side arms.

(6) Preferably, the two load-side arms are symmetrical in shape in a direction in which the two load-side arms are opposed to each other.

In this structure, when the reaction force, which acts on the pad from the disc in the direction the disc rotates, is transmitted to the load-side arms, uneven loads on the load-side arms may be limited. This further increases the strength of the entire load-side arms.

Effect of the Invention

The present invention provides a railway vehicle disc brake apparatus that is reduced in weight and has strength sufficient to withstand a reaction force from a disc.

EMBODIMENTS OF THE INVENTION

First Embodiment

Embodiments of the present invention will now be described with reference to the drawings. The present invention is not limited to the embodiments described below and may be widely applied as a railway vehicle disc brake apparatus.

Figure 1:
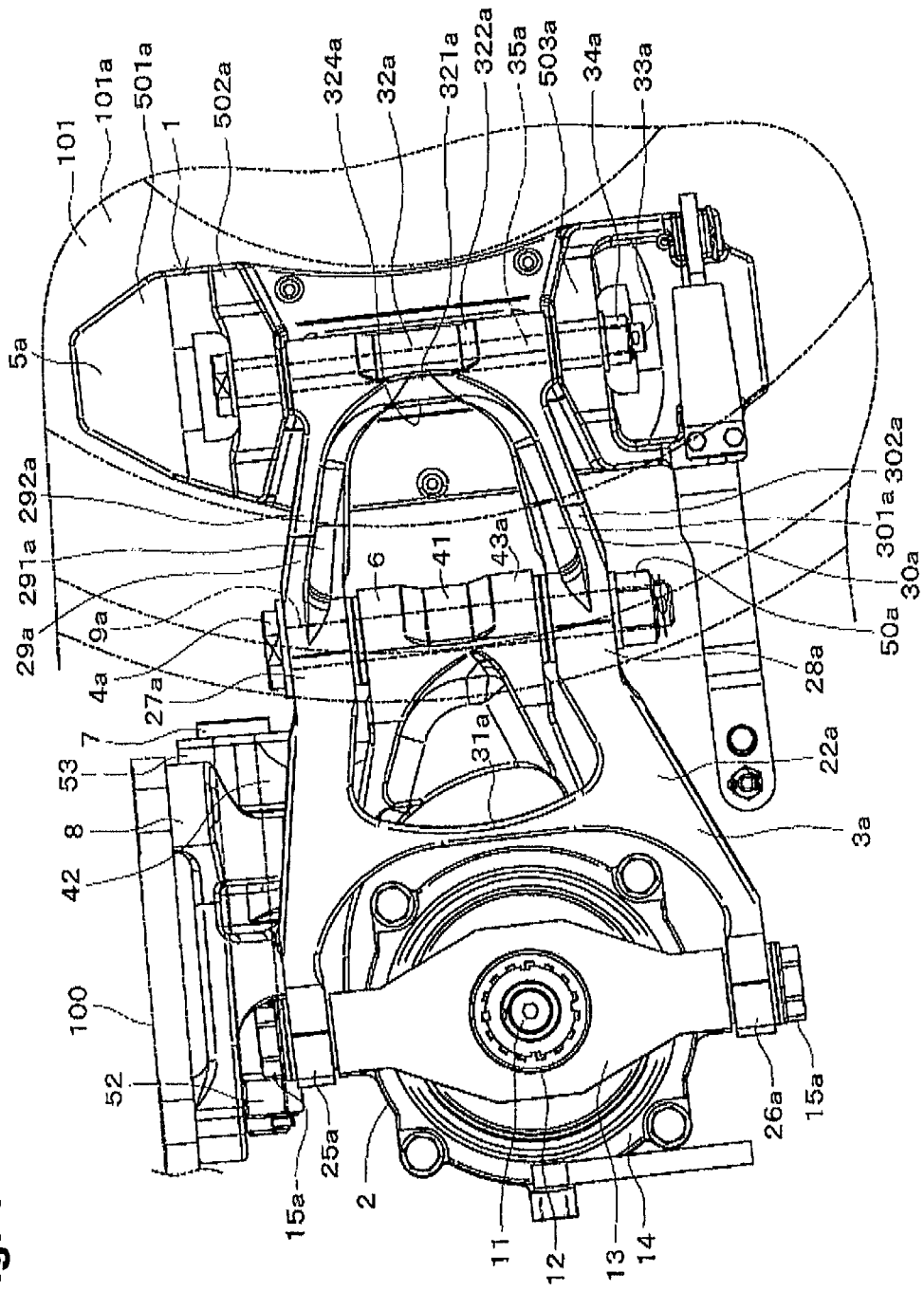
FIG. 1 is a side view of one embodiment of a railway vehicle disc brake apparatus according to the present invention.
Figure 2:
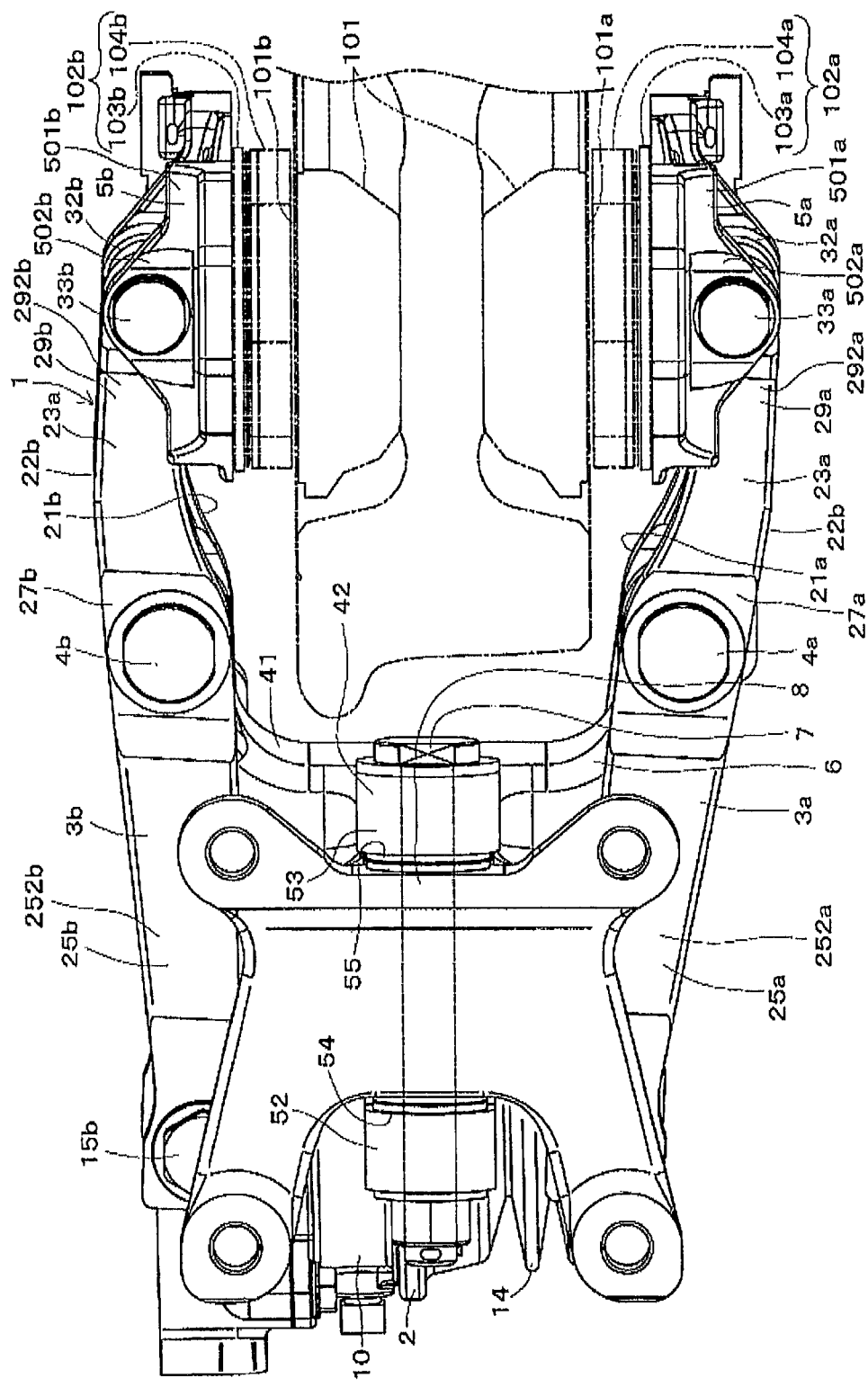
FIG. 2 is a plan view of the railway vehicle disc brake apparatus.
Figure 3:
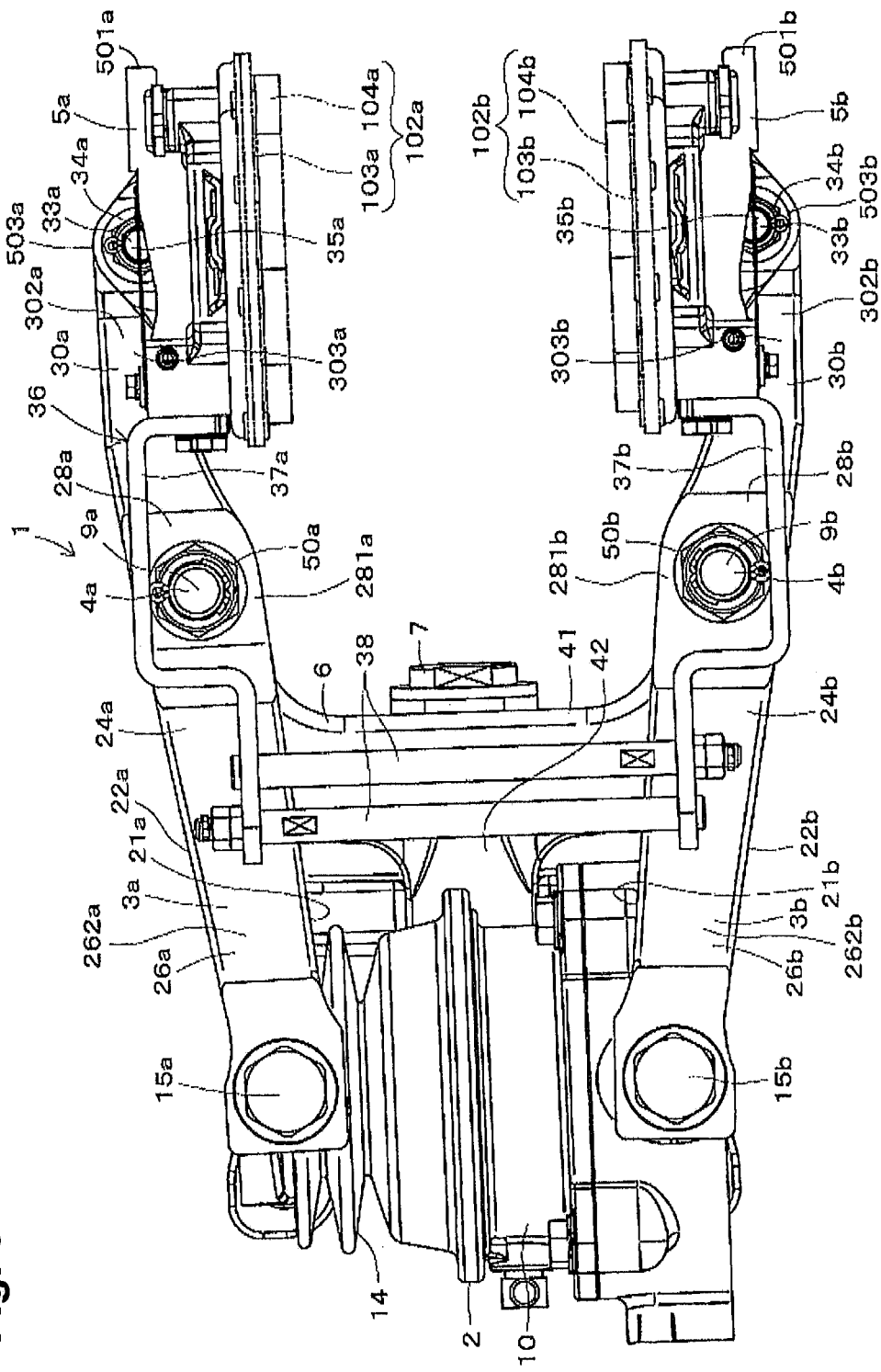
FIG. 3 is a bottom view of the railway vehicle disc brake apparatus.
Figure 4:
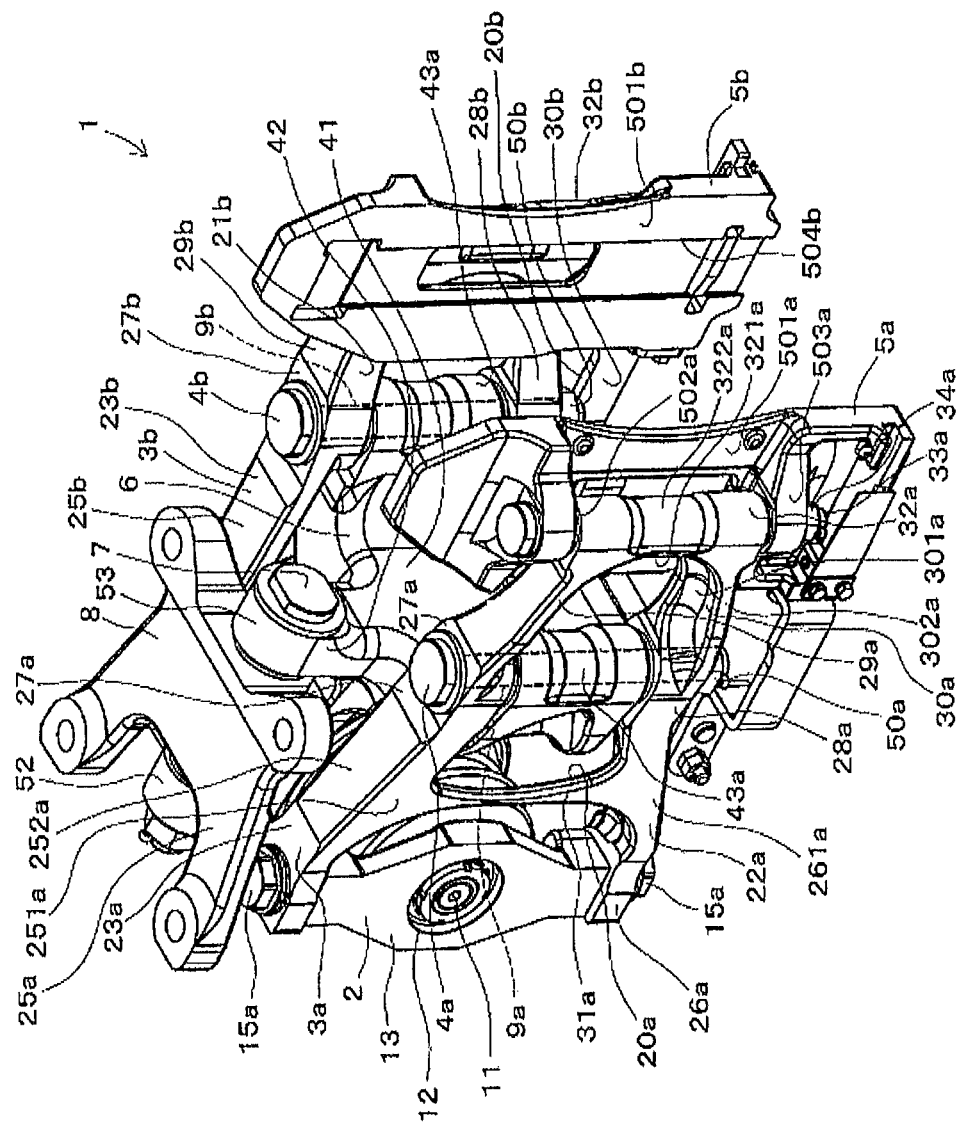
FIG. 4 is a perspective view of the railway vehicle disc brake apparatus as viewed from above.
Figure 5:
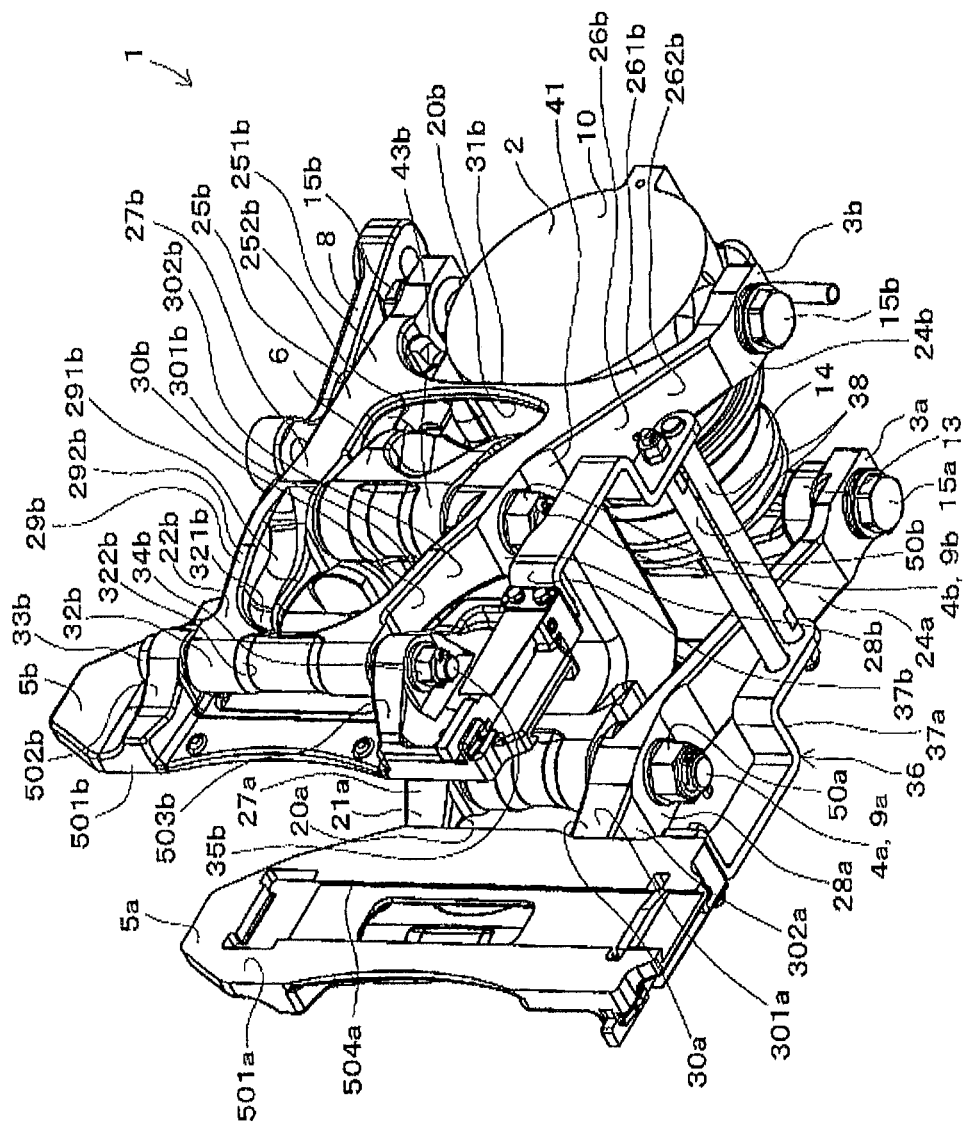
FIG. 5 is a perspective view of the railway vehicle disc brake apparatus as viewed from below.

FIG. 1 is a side view of one embodiment of a railway vehicle disc brake apparatus 1 according to the present invention. FIG. 1 shows when the vehicle disc brake apparatus 1 is mounted on a chassis 100. FIG. 2 is a plan view of the railway vehicle disc brake apparatus 1. FIG. 3 is a bottom view of the railway vehicle disc brake apparatus 1. In FIGS. 1 to 3, components other than the railway vehicle disc brake apparatus 1 are shown in the double-dashed lines, which are imaginary lines. FIG. 4 is a perspective view of the railway vehicle disc brake apparatus 1 as viewed from above. FIG. 5 is a perspective view of the railway vehicle disc brake apparatus 1 as viewed from below.

Referring to FIGS. 1 and 2, a railway vehicle includes the railway vehicle disc brake apparatus 1 (hereafter, may be simply referred to as the brake apparatus 1). The brake apparatus 1 is located on a lower portion of the chassis 100 of the railway vehicle (hereafter, may be simply referred to as the vehicle). The vehicle disc brake apparatus 1 is adjacent to a disc 101, which is located at the lower portion of the chassis 100. The disc 101, which is a disc-shaped member, rotates together with a wheel when the vehicle is traveling. The brake apparatus 1 holds the disc 101 to apply a friction force to the disc 101. This applies a braking force to the disc 101 and decelerates the vehicle.

The brake apparatus 1 includes a cylinder device 2 (drive device), two caliper levers 3a, 3b, fulcrum shaft members 4a, 4b, two pad holders 5a, 5b, a lever support member 6, a suspension shaft member 7, and a fixing bracket 8.

Hereafter, the frame of reference for the vertical direction, the front-rear direction, and the lateral direction is the brake apparatus 1 mounted on the chassis 100 that is located on a horizontal surface for use. The lateral direction is the direction in which the caliper levers 3a, 3b are opposed to each other. The front-rear direction is the direction in which the caliper levers 3a, 3b extend. Hereafter, the structure of the vehicle disc brake apparatus 1, which is not operated, will be described unless otherwise specified.

Referring to FIGS. 1, 2, 3, and 5, the cylinder device 2 is arranged so that the caliper levers 3a, 3b pivot about fulcrum shafts 9a, 9b of the fulcrum shaft members 4a, 4b extending in the vertical direction. In the present embodiment, the fulcrum shaft members 4a, 4b are each a threaded member. The fulcrum shafts 9a, 9b are each a round shaft including a male-threaded distal end. The cylinder device 2 uses a fluid, such as air or oil, as a hydraulic fluid. The cylinder device 2 is opposed to the disc 101 in the front-rear direction. The cylinder device 2 is also sandwiched between the caliper levers 3a, 3b.

The cylinder device 2 includes a cylinder housing 10, a rod 11, a coupling 12, a column 13, and a boot 14.

The cylinder housing 10 is hollow. The cylinder housing 10 includes an upper end portion and a lower end portion, which are rotationally supported by threaded members 15b, 15b on the caliper lever 3b. The cylinder housing 10 supports the rod 11.

The rod 11 moves in the lateral direction when the fluid moves in a cylinder chamber (not shown) of the cylinder housing 10. The coupling 12 couples a distal end of the rod 11 and the column 13.

The column 13 extends vertically. The column 13 is configured to move in the lateral direction integrally with the rod 11 through the coupling 12. The column 13 includes an upper end portion and a lower end portion, which are rotationally supported by threaded members 15a, 15a on the caliper lever 3b.

The boot 14 is located between the column 13 and the cylinder housing 10. The boot 14 is bellows-shaped and capable of expanding and contracting. The boot 14 surrounds the rod 11. The cylinder device 2 is located between the caliper levers 3a, 3b.

The two caliper levers 3a, 3b support two pads 102a, 102b, which are located at opposite sides of the disc 101. The caliper levers 3a, 3b respectively pivot about the fulcrum shafts 9a, 9b of the fulcrum shaft member 4a, 4b to press the pads 102a, 102b to side surfaces 101a, 101b of the disc 101. In the present embodiment, the caliper levers 3a, 3b are each a metal formed by casting, forging, sintering, or other manufacturing processes. In the present embodiment, the caliper levers 3a, 3b are each a solid member and include no inner cavity other than through holes.

The caliper levers 3a, 3b are arranged so that the cylinder device 2 and the disc 101 are located between the caliper levers 3a, 3b. The caliper levers 3a, 3b each extend in the front-rear direction from a location adjacent to the cylinder device 2 to a location adjacent to the disc 101. The caliper levers 3a, 3b are each elongated in the front-rear direction. In the present embodiment, the caliper levers 3a, 3b are each generally A-shaped as viewed from beside (FIG. 1).

Figure 6:
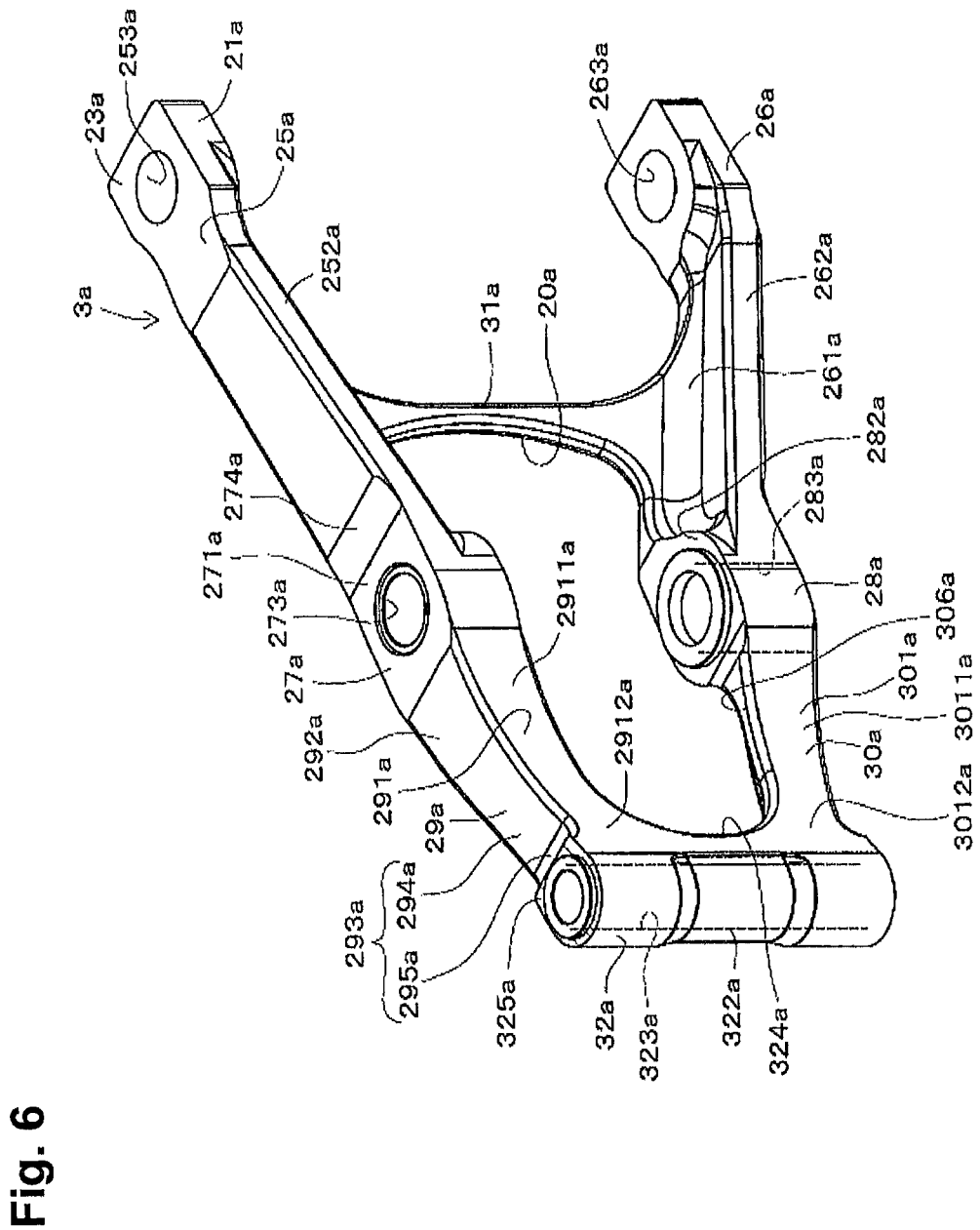
FIG. 6 is a perspective view of a caliper lever showing an inner surface of the caliper lever.
Figure 7:
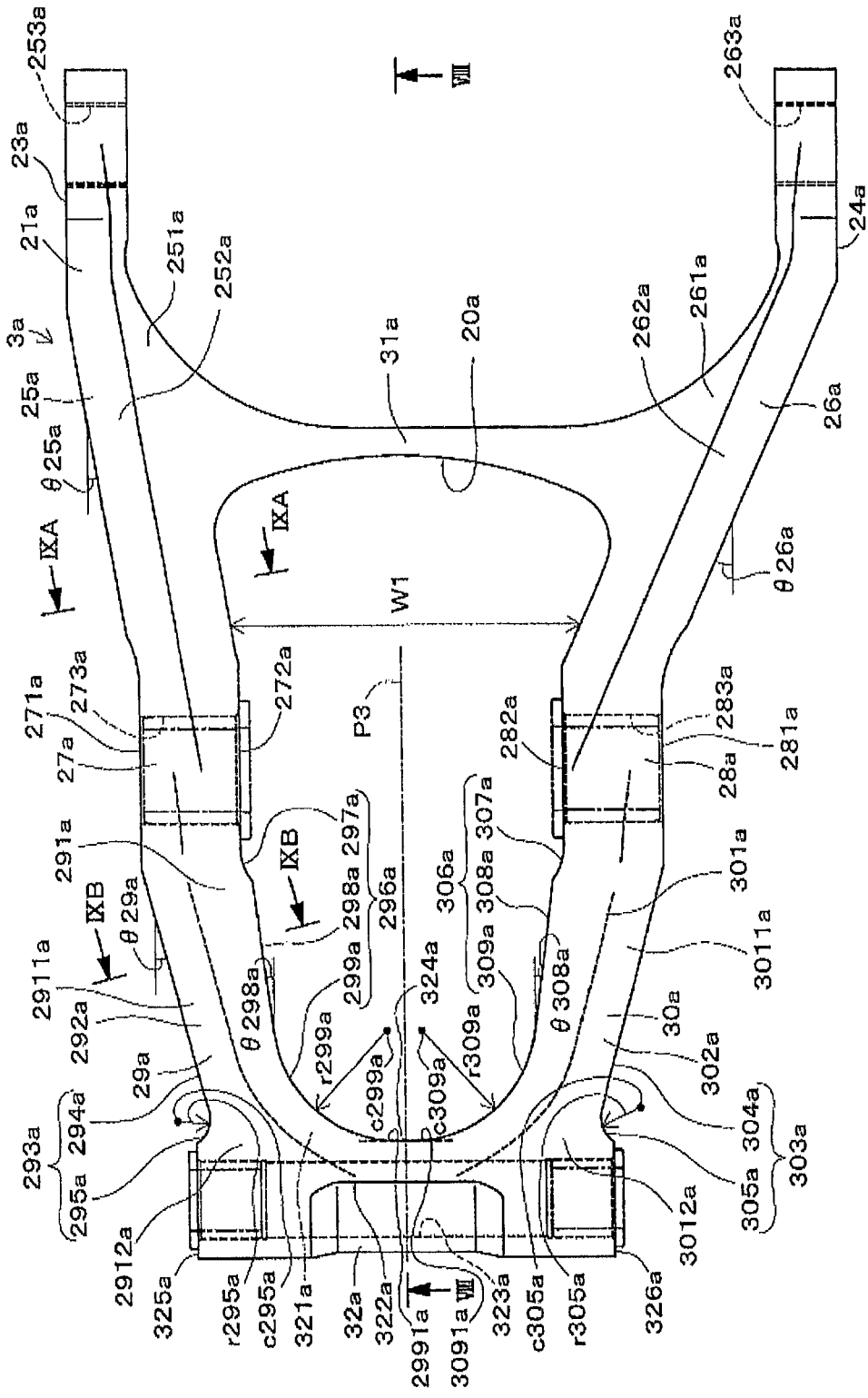
FIG. 7 is a side view of the caliper lever showing the inner surface of the caliper lever.
Figure 8:
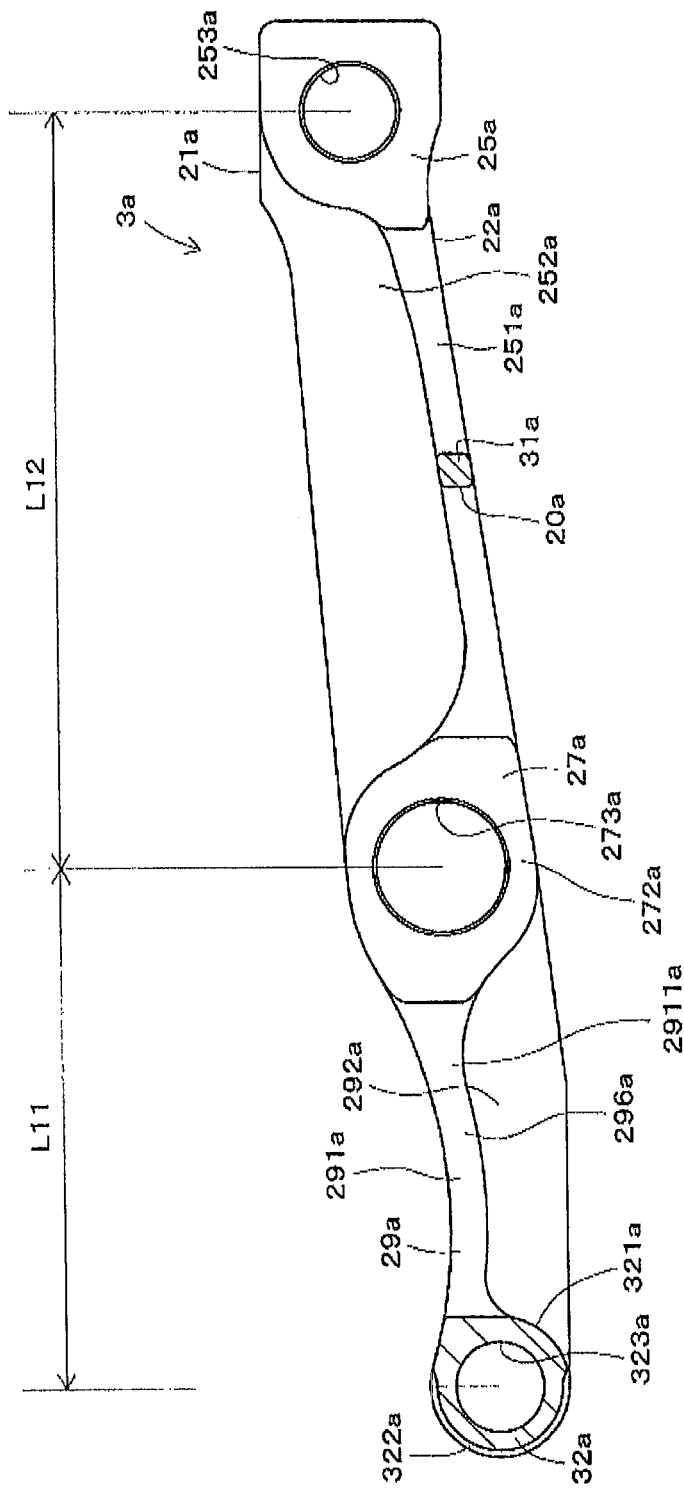
FIG. 8 is a cross-sectional view taken along line VIII-VIII of FIG. 7 as the caliper lever is viewed from below.
Figure 9A:
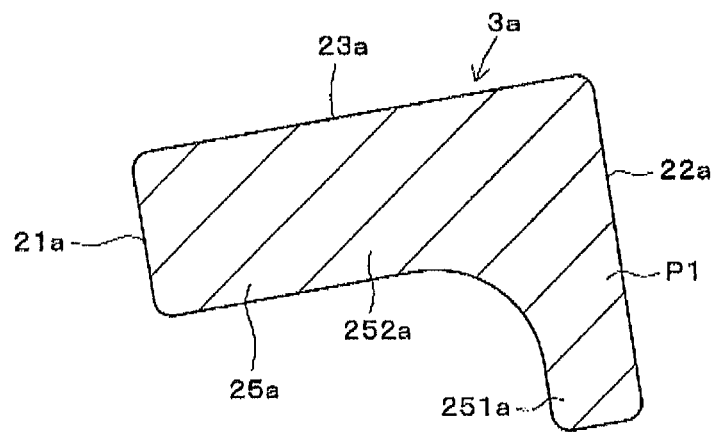
FIG. 9A is a cross-sectional view taken along line IXA-IXA of FIG. 7.
Figure 9B:
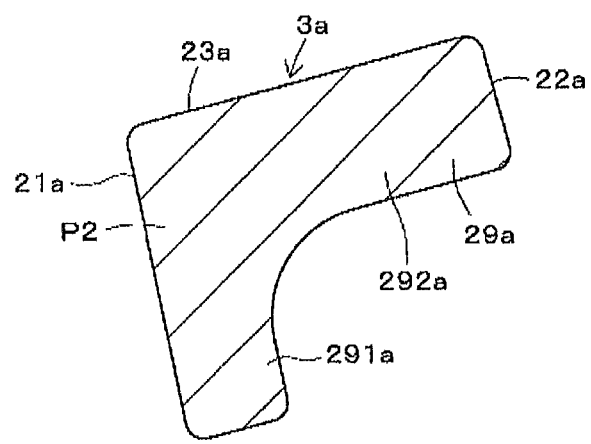
FIG. 9B is a cross-sectional view taken along line IXB-IXB of FIG. 7.

FIG. 6 is a perspective view of the caliper lever 3a showing an inner surface 21a of the caliper lever 3a. FIG. 7 is a side view of the caliper lever 3a showing the inner surface 21a of the caliper lever 3a. FIG. 8 is a cross-sectional view taken along line VIII-VIII of FIG. 7 as the caliper lever 3a is viewed from below. FIG. 9A is a cross-sectional view taken along line IXA-IXA of FIG. 7. FIG. 9B is a cross-sectional view taken along line IXB-IXB of FIG. 7.

Referring to FIGS. 1 and 6 to 9B, the caliper lever 3a is arranged to be inclined so that the caliper lever 3a is closer to the ground surface as the distance from the disc 101 increases in the front-rear direction. However, the gradient of the caliper lever 3a is a few degrees, or slight, relative to a horizontal plane (ground surface). Thus, in the description hereafter, the inclination will be considered as substantially zero.

The caliper lever 3a includes the inner surface 21a, which is opposed to the cylinder device 2, an outer surface 22a, which is opposed to an outer side of the brake apparatus 1 and paired with the inner surface 21a, an upper surface 23a oriented upward, and a lower surface 24a oriented downward.

The caliper lever 3a also includes two effort-side arms 25a, 26a, which are located one above the other, two fulcrum portions 27a, 28a, which are located one above the other, two load-side arms 29a, 30a, which are located one above the other, a connector 31a, and a load portion 32a.

The effort-side arms 25a, 26a are coupled to the cylinder device 2. The effort-side arm 25a is located above the effort-side arm 26b. The effort-side arms 25a, 26a each include a first end in the front-rear direction that defines a first end, in the front-rear direction, of the caliper lever 3a. The first ends of the effort-side arms 25a, 26a each have the form of a flat and tetragonal plate and respectively include through holes 253a, 263a, extending in the vertical direction. The threaded members 15a, 15a are inserted into the through holes 253a, 263a.

The effort-side arm 25a includes an intermediate portion and a second end in the front-rear direction that are inclined downward so as to become lower as the first end of the effort-side arm 25a becomes farther. In contrast, the effort-side arm 26a includes an intermediate portion and a second end in the longitudinal direction that are inclined upward so as to become higher as the first end of the effort-side arm 26a becomes farther. The angle (inclination angle) formed by the horizontal plane and the intermediate portion and the second end of the effort-side arm 26a is larger than the inclination angle formed by the horizontal plane and the intermediate portion and the second end of the effort-side arm 25a.

By setting the inclination angle of the intermediate portion and the second end of the effort-side arm 25a and the inclination angle of the intermediate portion and the second end of the effort-side arm 26a, the vertical distance may be set between the effort-side arms 25a, 26a. The distance is set in accordance with the size of the column 13 of the cylinder device 2. The inclination angle of the intermediate portion and the second end of the effort-side arm 25a may be set to be the same value as or a different value from the inclination angle of the intermediate portion and the second end of the effort-side arm 26a.

The intermediate portion and the second end of the effort-side arm 25a include a first part 251a and a second part 252a.

In a cross-section P1 (cross-section shown in FIG. 9A) that is orthogonal to a direction the effort-side arm 25a extends, the first part 251a and the second part 252a are L-shaped as a whole. In the cross-section P1, the first part 251a and the second part 252a extend and intersect each other. In the present embodiment, the first part 251a and the second part 252a extend orthogonal to each other. The intermediate portion and the second end of the effort-side arm 26a are located below the first part 251a and the second part 252a, which have the structure described above.

The intermediate portion and the second end of the effort-side arm 26a include a first part 261a and a second part 262a. The intermediate portion and the second end of the effort-side arm 26a have generally the same structure as the intermediate portion and the second end of the effort-side arm 25a.

More specifically, in a cross-section (not shown) orthogonal to a direction the effort-side arm 26a extends, the first part 261a and the second part 262a of the effort-side arm 26a are L-shaped as a whole. The first part 251a and the second part 262a extend and intersect each other. In the present embodiment, the first part 261a and the second part 262a extend orthogonal to each other.

Additionally, the lower first and second parts 261a, 262a in a cross-section orthogonal to the direction in which the effort-side arm 26a extends are shaped to be generally symmetrical to the upper first and second parts 251a, 252a in the cross-section P1 orthogonal to the direction in which the effort-side arm 25a extends.

The effort-side arms 25a, 26b, which have the structure described above, are connected by the connector 31a.

The connector 31a extends between the first parts 251a, 261a of the effort-side arms 25a, 26a and is continuous with each of the first parts 251a, 261a. The connector 31a extends generally parallel to the vertical direction. The connector 31a is shaped to be narrow in the middle as viewed from beside. In the present embodiment, the thickness (length in the lateral direction) of the connector 31a is set to be generally constant. The connector 31a is smoothly continuous with each of the first parts 251a, 261a. This limits the occurrence of stress concentration on parts connecting the connector 31a and the first parts 251a, 261a.

The connector 31a, the effort-side arms 25a, 26a, the fulcrum portions 27a, 28a, the load-side arms 29a, 30a, and the load portion 32 define an opening 20a. The opening 20a is shaped to be elongated in the front-rear direction as viewed from beside.

The opening 20a has a width W1 in the vertical direction that increases and then decreases in a stepped manner from the connector 31a toward the load portion 32. More specifically, in the connector 31a, the width W1 continuously increases as the load portion 32 becomes closer. In the effort-side arms 25a, 26a, the width W1 continuously decreases as the load portion 32 becomes closer. In the fulcrum portions 27a, 28a, the width W1 is generally constant. In the load-side arms 29a, 30a, the width W1 gradually decreases as the load portion 32 becomes closer.

The fulcrum portions 27a, 28a each extend from the corresponding one of the effort-side arms 25a, 26a and are coupled to the fulcrum shaft member 4a. The fulcrum portions 27a, 28a, which are located one above the other, are symmetrical in shape. The fulcrum portions 27a, 28a are each block-shaped. The fulcrum portion 27a is located above the fulcrum portion 28a. The fulcrum portion 27a is shaped to be smoothly continuous with the effort-side arm 25a and the load-side arm 29a. This limits the occurrence of stress concentration. In the same manner, the fulcrum portion 28a is shaped to be smoothly continuous with the effort-side arm 26a and the load-side arm 30a. This limits the occurrence of stress concentration.

The fulcrum portion 27a includes an upper surface 271a and an inward surface 272a. The upper surface 271a forms a portion of the upper surface 23a of the caliper lever 3a. The upper surface 271a includes a first end that is curved and recessed downward. The first end of the upper surface 271a is connected to the upper surface 23 in the effort-side arm 25a. The upper surface 271a includes a portion extending parallel to a reference plane P3. The reference plane P3 is a virtual plane orthogonal to a through hole 323a (load shaft 35a) of the load portion 32a and extends through the vertical middle of the load portion 32a, which extends in the vertical direction. The reference plane P3 extends orthogonal to a direction in which the load portion 32a extends. The inward surface 272a is flat and oriented toward the inside of the caliper lever 3a as viewed from beside. That is, the inward surface 272a is opposed to the reference plane P3.

The fulcrum portion 28a includes a lower surface 281a and an inward surface 282a. The lower surface 281a forms a portion of the lower surface 24a of the caliper lever 3a. The lower surface 281a includes a first end that is curved and recessed upward. The first end of the lower surface 281a is connected to the lower surface 24a in the effort-side arm 26a. The lower surface 281a includes a portion extending parallel to the reference plane P3. The inward surface 282a is flat and oriented toward the inside of the caliper lever 3a as viewed from beside. That is, the inward surface 282a is opposed to the reference plane P3.

The fulcrum portions 27a, 28a respectively include through holes 273a, 283a extending vertically. A tubular bushing is fitted into each of the through holes 273a, 283a. The fulcrum portions 27a, 28a are each coupled to the fulcrum shaft member 4a by the corresponding one of the bushings. The fulcrum portions 27a, 28a are respectively continuous with the load-side arms 29a, 30a, which are located one above the other.

Figure 10:
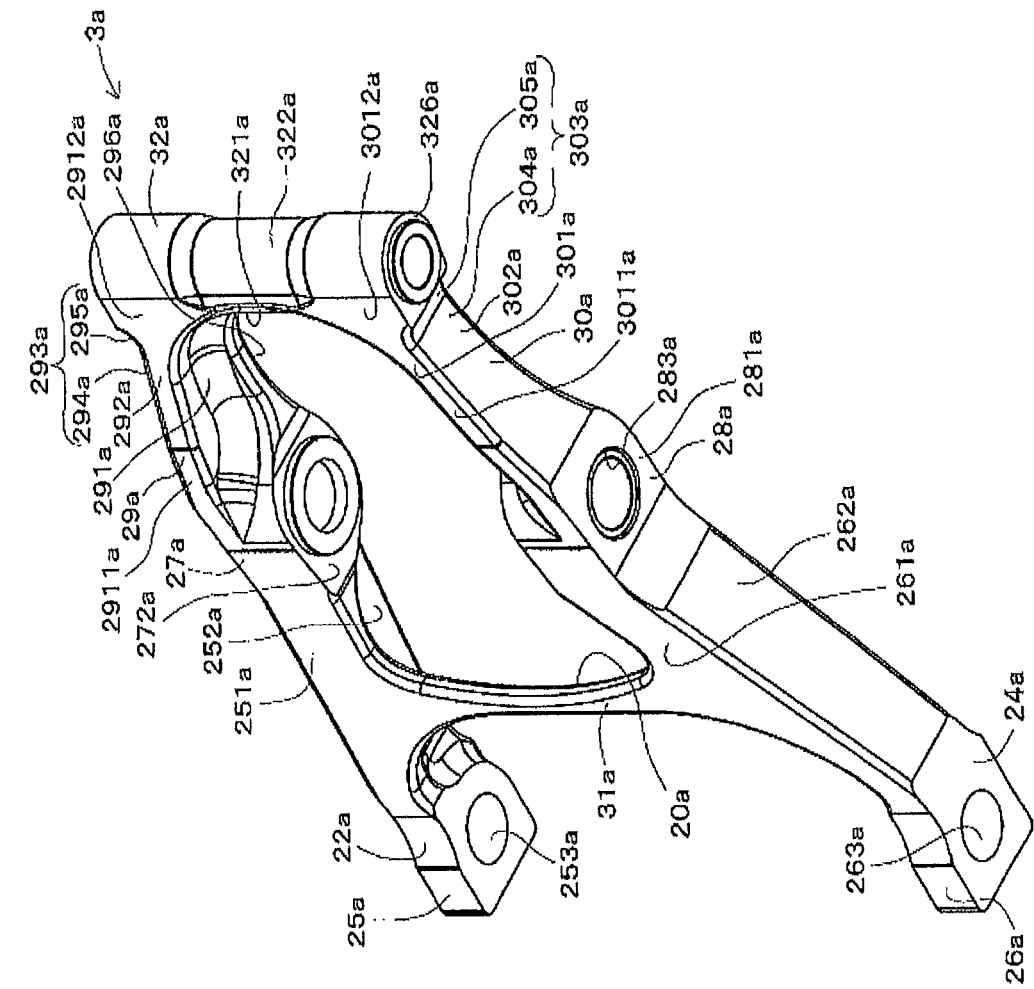
FIG. 10 is a perspective view of the caliper lever showing an outer surface of the caliper lever.

FIG. 10 is a perspective view of the caliper lever 3a showing the outer surface 22a of the caliper lever 3a. Referring to FIGS. 1 and 7 to 10, the load-side arms 29a, 30a each extend from a side of the fulcrum shaft member 4a toward a side of the pad 102a (pad holder 5a). The load-side arm 29a is located above the load-side arm 30a. The load-side arms 29a, 30a each include a first end extending from the corresponding one of the fulcrum portions 27a, 28a.

The load-side arm 29a is inclined so that the load-side arm 29a extends downward from the first end of the load-side arm 29a toward the load portion 32a. In the same manner, the load-side arm 30a is inclined so that the load-side arm 30a extends upward from the first end of the load-side arm 30a toward the load portion 32a. In this manner, the load-side arms 29a, 30a are inclined so that the distance between the load-side arms 29a, 30a decreases as the load portion 32a becomes closer.

The upper load-side arm 29a is shaped to be symmetrical to the lower load-side arm 30a. That is, the load-side arms 29a, 30a are symmetrical in shape in a direction the load-side arms 29a, 30a are opposed to each other. As viewed from beside (FIG. 7), an angle θ29a between the horizontal plane and the load-side arm 29a is substantially the same as an angle θ25a between the horizontal plane and the intermediate portion and the second end of the effort-side arm 25a. The angle θ29a is smaller than an angle θ26a between the horizontal plane and the intermediate portion and the second end of the effort-side arm 26a (θ29a<θ26a).

In the present embodiment, the angle θ29a is formed by the horizontal plane and the upper surface 23a in a flat portion 294a of the load-side arm 29a. The angle θ25a is formed by the horizontal plane and the upper surface 23a in the intermediate portion of the effort-side arm 25a. The angle θ26a is formed by the horizontal plane and the lower surface 24a in the intermediate portion of the effort-side arm 26a.

The load-side arm 29a includes a first part 291a and a second part 292a.

In a cross-section P2 (cross-section shown in FIG. 9B) that is orthogonal to a direction the load-side arm 29a extends, the first part 291a and the second part 292a are L-shaped as a whole. In the cross-section P2, the first part 291a and the second part 292a extend and intersect each other. In the present embodiment, the first part 291a and the second part 292a extend orthogonal to each other.

The load-side arm 29a includes an upper surface 293a that forms a portion of the upper surface 23a of the caliper lever 3a. The upper surface 293a extends from the upper surface 271 of the fulcrum portion 27a.

The upper surface 293a includes the flat portion 294a and a curved portion 295a.

The flat portion 294a includes a flat surface and inclined relative to the reference plane P3. The flat portion 294a is smoothly continuous with the curved portion 295a.

The curved portion 295a smoothly forms a part connecting the load-side arm 29a and the load portion 32a. The curved portion 295a includes a curved surface that has a downwardly recessed shape. In the present embodiment, the curved portion 295a is shorter than the flat portion 294a in the front-rear direction. The curved portion 295a includes a lower end, which is continuous with the flat portion 294a.

The load-side arm 29a includes an inward surface 296a, which is paired with the upper surface 293a. The inward surface 296a is oriented in a direction extending into the opening 20a. The inward surface 296a is opposed to the inward surface 306a of the load-side arm 30a. The inward surfaces 296a, 306a are one example of "two inward surfaces opposed to each other" of the present invention.

The inward surface 296a includes a first curved portion 297a, a flat portion 298a, and a second curved portion 299a.

The first curved portion 297a is continuous with the inward surface 272a of the fulcrum portion 27a. The first curved portion 297a is arc-shaped as viewed from beside. The first curved portion 297a has an upwardly recessed shape extending from the inward surface 272a and becoming lower as the load portion 32 becomes closer. The first curved portion 297a is located below a boundary between the upper surface 271a of the fulcrum portion 27a and the upper surface 293a of the load-side arm 29a. That is, the first curved portion 297a is located in a boundary between the fulcrum portion 27a and the load-side arm 29a. The flat portion 298a extends from the first curved portion 297a.

The flat portion 298a extends from the second curved portion 299a toward the fulcrum portion 27a. The flat portion 298a is located below the flat portion 294a. The flat portion 298a includes a flat surface and inclined relative to the reference plane P3. The flat portion 298a becomes closer to the reference plane P3 as the load portion 32 becomes closer. In the present embodiment, an angle θ298a between the flat portion 298a and the reference plane P3 is set to be smaller than the angle θ29a between the flat portion 294a and the reference plane P3 (θ298a<θ29a). Thus, in the load-side arm 29, the gradient of the flat portion 298a, which is oriented inward, differs from that of the flat portion 294a, which is oriented outward. In the present embodiment, in the front-rear direction, the flat portion 298a is longer than the first curved portion 297a and shorter than the flat portion 294a. The flat portion 298a is continuous with the second curved portion 299a.

The second curved portion 299a is arranged to limit stress concentration on the periphery of a part connecting the load-side arm 29a and the load portion 32a. The second curved portion 299a is one example of "an edge defining the opening around the load portion" of the present invention. The second curved portion 299a is arc-shaped as viewed from beside and extends downward as the load portion 32a becomes closer. In the present embodiment, the second curved portion 299a has a curvature center c299a, which is located above the reference plane P3. The curvature center c299a is located below the flat portions 294a, 298a. In the present embodiment, the second curved portion 299a includes one end 2991a, which is arranged next to the curvature center c299a in the front-rear direction.

As clearly shown in FIG. 8, as viewed in the vertical direction, the inner surface 21a in the load-side arm 29a is curved and extends so as to become farther from the caliper lever 3b and then become closer to the caliper lever 3b as the fulcrum portion 27a becomes farther. Additionally, as viewed in the vertical direction, the outer surface 22a in the load-side arm 29a extends so as to become farther from the caliper lever 3b and then become closer to the caliper lever 3b as the fulcrum portion 27a becomes farther.

In the above structure, as clearly shown in FIG. 7, as viewed from beside, the load-side arm 29a includes a part 2911a including the flat portions 294a, 298a, which are located one above the other. The part 2911a is tapered toward the load portion 32a. Additionally, as viewed from beside, the load-side arm 29a includes a part 2912a, which is located above the second curved portion 299a and continuous with the load portion 32a.

The load-side arm 30a is located below the load-side arm 29a, which has the structure described above.

As described above, the lower load-side arm 30a is shaped to be symmetrical to the upper load-side arm 29a. That is, the load-side arms 29a, 30a are symmetrical in shape in the direction in which the load-side arms 29a, 30a are opposed to each other. Thus, the load-side arm 30a will be briefly described.

More specifically, the load-side arm 30a includes a first part 301a and a second part 302a. The lower first part 301a and the lower second part 302a are shaped to be symmetrical to the upper first part 291a and the upper second part 292a.

The load-side arm 30a includes a lower surface 303a, which defines the lower surface 24a of the caliper lever 3a, and an inward surface 306a. The lower surface 303a and the inward surface 306a are shaped to be symmetrical to the upper surface 293a and the inward surface 296a, which are located above the lower surface 303a and the inward surface 306a.

The lower surface 303a includes a flat portion 304a and a curved portion 305a. The flat portion 304a and the curved portion 305a are shaped to be symmetrical to the flat portion 294a and the curved portion 295a, which are located above the flat portion 304a and the curved portion 305a.

The inward surface 306a includes a first curved portion 307a, a flat portion 308a, and a second curved portion 309a. The first curved portion 307a, the flat portion 308a, and the second curved portion 309a are shaped to be symmetrical to the first curved portion 297a, the flat portion 298a, and the second curved portion 299a, which are located above the first curved portion 307a, the flat portion 308a, and the second curved portion 309a. The second curved portion 309a of the inward surface 306a is arranged so that the distance from the second curved portion 299a decreases as the load portion 32a becomes closer. The second curved portions 299a, 309a are one example of "two arcs" of the present invention.

The load-side arms 29a, 30a (e.g., inward surfaces 296a, 306a) are inclined so that the distance between the load-side arms 29a, 30a decreases as the load portion 32a becomes closer. Additionally, the load-side arms 29a, 30a (e.g., inward surfaces 296a, 306a) are each inclined relative to the reference plane P3.

The load-side arms 29a, 30a each include a second end. The second ends of the load-side arms 29a, 30a are connected to each other by the load portion 32a.

Referring to FIGS. 1, 7, and 8, the load portion 32a is configured to hold to pad holder 5a. The load portion 32a defines a second end, in the front-rear direction, of the caliper lever 3a. The load portion 32a is tubular and extends vertically. The load portion 32a includes an upper part, which is continuous with the second end of the load-side arm 29a. The load portion 32a includes a lower part, which is continuous with the second end of the load-side arm 30a. The outer surface 22a in the load portion 32a includes a recess 321a. The recess 321a is arc-shaped as viewed from beside and smoothly continuous with each of the outer surface 22a in each of the load-side arms 29a, 30a. This limits the occurrence of stress concentration. Additionally, the load portion 32a includes a circumferential surface including a recess 322a. The recess 322a is defined by a smooth surface. This limits the occurrence of stress concentration. In the present embodiment, the recess 321a and the recess 322a are separated from each other.

In the front-rear direction, the load-side arms 29a, 30a are set to be shorter than the effort-side arms 25a, 26a in overall length. In the present embodiment, in the front-rear direction, the length L11 from the center of the through hole 273a of the fulcrum portion 27a to the center of a through hole 323a of the load portion 32a is less than the length L12 from the center of the through hole 273a to the center of the through hole 253a of the effort-side arm 25a (L11<L12).

The load portion 32a includes an inward surface 324a oriented in the direction extending into the opening 20a. The inward surface 324a connects the second curved portions 299a, 309a of the load-side arms 29a, 30a. The inward surface 324a is shaped to be symmetrical about the reference plane P3. In the present embodiment, the inward surface 324a is orthogonal to the reference plane P3. The inward surface 324a includes an upper end, which is continuous with the end 2991a of the second curved portion 299a. The inward surface 324a includes a lower end, which is continuous with one end 3091a of the second curved portion 309a.

The load portion 32a includes an upper surface 325a, which is flat and extends parallel to the reference plane P3. The upper surface 325a of the load portion 32a is continuous with the curved portion 295a of the upper surface 293a of the load-side arm 29a. Also, the load portion 32a includes a lower surface 326a, which is flat and extends parallel to the reference plane P3. The lower surface 326a of the load portion 32a is continuous with the curved portion 305a of the lower surface 303a of the load-side arm 30a.

The through hole 323a of the load portion 32a extends vertically and includes an upper end and lower end. A tubular bushing is fitted to each of the upper end and the lower end of the through hole 323a. The bushings and a load shaft member 33a support the pad holder 5a on the load portion 32a.

Referring to FIGS. 1, 2, 4, and 5, the pad holder 5a holds the pad 102a. The pad holder 5a includes a holder body 501a and projections 502a, 503a.

The holder body 501a is located adjacent to the inner surface 21a in the load portion 32a. The holder body 501a is plate-shaped and extends vertically. The holder body 501a has the form of an arc (the form corresponding to a portion of an annular shape) as viewed from beside. The holder body 501a and the side surface 101a of the disc 101 are opposed to each other in the lateral direction. The holder body 501a has an inner surface that includes a holding groove 504a extending vertically. The projections 502a, 503a project from an outer surface of the holder body 501a.

The projections 502a, 503a are each a small piece and formed integrally with the holder body 501a. The projection 502a is located above the load portion 32a. The projection 503a is located below the load portion 32a. In this manner, the load portion 32a is located between the projections 502a, 503a.

The projections 502a, 503a each include a through hole (not shown) extending vertically. The load shaft member 33a is a threaded member and includes a load shaft 35a. The load shaft 35a extends through the through hole of the projection 502a, the through hole of the load portion 32a, and the through hole of the projection 503a. The load shaft member 33a is thread-coupled to a nut 34a. Thus, the pad holder 5a is rotationally supported by the load portion 32a. The pad holder 5a, which has the structure described above, holds the pad 102a.

The pad 102a includes a base metal 103a and a friction material 104a. The base metal 103a is partially fitted into the holding groove 504a of the pad holder 5a. In this manner, the base metal 103a is held by the pad holder 5a. The friction material 104a is fixed to the base metal 103a and opposed to the side surface 101a of the disc 101. In this structure, the pad 102a is supported by the pad holder 5a and the load shaft member 33a on the caliper lever 3a.

The structure of the caliper lever 3a, the pad holder 5a, and the pad 102a has been described. The structure of the caliper lever 3b, the pad holder 5b, and the pad 102b at one lateral side is symmetrical to the structure of the caliper lever 3a, the pad holder 5a, and the pad 102a at the other lateral side and will not be described in detail.

More specifically, each component of the caliper lever 3b, the pad holder 5b, and the pad 102b is denoted by reference characters in which the numeral is the same as that of the corresponding component of the caliper lever 3a, the pad holder 5a, and the pad 102a and the alphabet "a" is replaced by "b". For example, reference characters of effort-side arms of the caliper lever 3b, which correspond to the effort-side arms 25a, 26a of the caliper lever 3a, are denoted by "effort-side arms 25b, 26b". The effort-side arms 25b, 26b of the caliper lever 3b each include a first end. The threaded members 15b, 15b, which have been described above, are coupled to the first ends of the effort-side arms 25b, 26b, respectively.

Referring to FIGS. 3 and 5, a synchronization mechanism 36, which is used to orient the pad holders 5a, 5b in the same direction, is located below the caliper levers 3a, 3b. The synchronization mechanism 36 is, for example, a link mechanism, and includes two first members 37a, 37b and second members 38, 38.

The first members 37a, 37b are flexible and each formed by bending a metal plate. The first members 37a, 37b each include a first end fixed to the corresponding one of the holder bodies 501a, 501b. The first members 37a, 37b extend in the front-rear direction. The first members 37a, 37b each include a second end. The second ends of the first members 37a, 37b are coupled by the second members 38, 38. The second members 38, 38 each have the form of a round rod and extend in the lateral direction.

Figure 11:
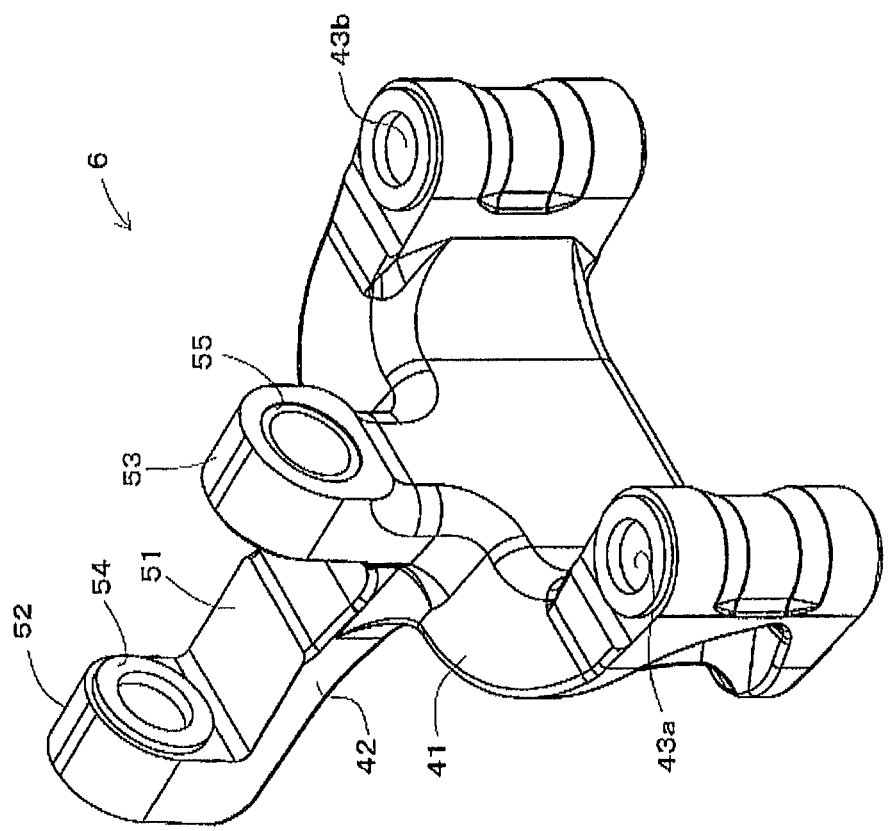
FIG. 11 is a perspective view of a lever support member as viewed from above.

The structure of the lever support member 6, which supports the caliper levers 3a, 3b with the fulcrum shaft members 4a, 4b, will now be described. FIG. 11 is a perspective view of the lever support member 6 as viewed from above.

Referring to FIGS. 1, 2, 4, and 11, the lever support member 6 is located between the caliper levers 3a, 3b. Additionally, the lever support member 6 is located between the cylinder device 2 and the disc 101.

The lever support member 6 is formed from a metal material or the like. In the present embodiment, the lever support member 6 is a component integrally formed by casting, forging, sintering, or other manufacturing processes. The lever support member 6 is a solid member. The lever support member 6 is Y-shaped in a plan view.

The lever support member 6 includes a first part 41 and a second part 42.

The first part 41 is coupled to the caliper levers 3a, 3b. The first part 41 is U-shaped in a plan view. The first part 41 includes a first lateral end, which is located between the fulcrum portions 27a, 28b of the caliper lever 3a.

The first end of the first part 41 is tubular and extends vertically. The first end of the first part 41 includes a through hole 43a extending vertically. The through hole 43a includes an upper end and a lower end. A bushing is fitted into each of the upper end and the lower end of the through hole 43a. The fulcrum shaft 9a of the fulcrum shaft member 4a extends through the through hole of the fulcrum portion 27a, the through hole 43a, and the through hole of the fulcrum portion 28a and is thread-coupled to a nut 50a.

In the above structure, the fulcrum portions 27a, 28a of the caliper lever 3a are pivotally supported by the fulcrum shaft 9a of the fulcrum shaft member 4a and the lever support member 6. More specifically, the caliper lever 3a is pivotally supported by the fulcrum shaft 9a so that the pad 102a is movable in directions extending toward the disc 101 and away from the disc 101.

The first part 41 includes a second end that has the same structure as the first end of the first part 41. The second end of the first part 41 is located between the fulcrum portions 27b, 28b of the caliper lever 3b and includes a through hole 43b extending vertically. The through hole 43b includes an upper end and a lower end. A bushing is fitted into each of the upper end and the lower end of the through hole 43b. The fulcrum shaft 9b of the fulcrum shaft member 4b extends through the through hole of the fulcrum portion 27b, the through hole 43b, and the fulcrum portion 28b and is thread-coupled to a nut 50b.

In the above structure, the fulcrum portions 27b, 28b of the caliper lever 3b are pivotally supported by the fulcrum shaft 9b of the fulcrum shaft member 4b and the lever support member 6. More specifically, the caliper lever 3b is pivotally supported by the fulcrum shaft 9b so that the pad 102b is movable in directions extending toward the disc 101 and away from the disc 101. The second part 42 is located above the first part 41, which has the structure described above.

The second part 42 is coupled to a fixing bracket 8 by the suspension shaft member 7. The second part 42 is U-shaped as viewed from beside and includes two coupling portions 52, 53, which are located beside each other in the front-rear direction. The coupling portions 52, 53 are each tubular.

Tubular bushings 54, 55 are fitted into the coupling portions 52, 53, respectively. The coupling portions 52, 53 are supported by the bushings 54, 55 and the suspension shaft member 7 on the fixing bracket 8.

In the above structure, the lever support member 6 is suspended by the suspension shaft member 7 from the fixing bracket 8 and pivotal about the suspension shaft member 7, which extends in the front-rear direction. The fixing bracket 8 is fixed to a lower portion of the chassis 100 using thread members (not shown).

Referring to FIGS. 1 and 2, the brake apparatus 1, which has the structure described above, operates when applying the brakes on the vehicle. More specifically, when the cylinder device 2 is driven, the rod 11 of the cylinder device 2 is pushed out from the cylinder housing 10. This increases the distance between the effort-side arms 25a, 25b of the caliper levers 3a, 3b and the distance between the effort-side arms 26a, 26b of the caliper levers 3a, 3b. Thus, the caliper levers 3a, 3b pivot about the fulcrum shafts 9a, 9b of the fulcrum shaft members 4a, 4b, respectively. The pivoting decreases the distance between the load portions 32a, 32b of the caliper levers 3a, 3b. Consequently, the pads 102a, 102b are respectively pressed against the side surfaces 101a, 101b of the disc 101.

Figure 12:
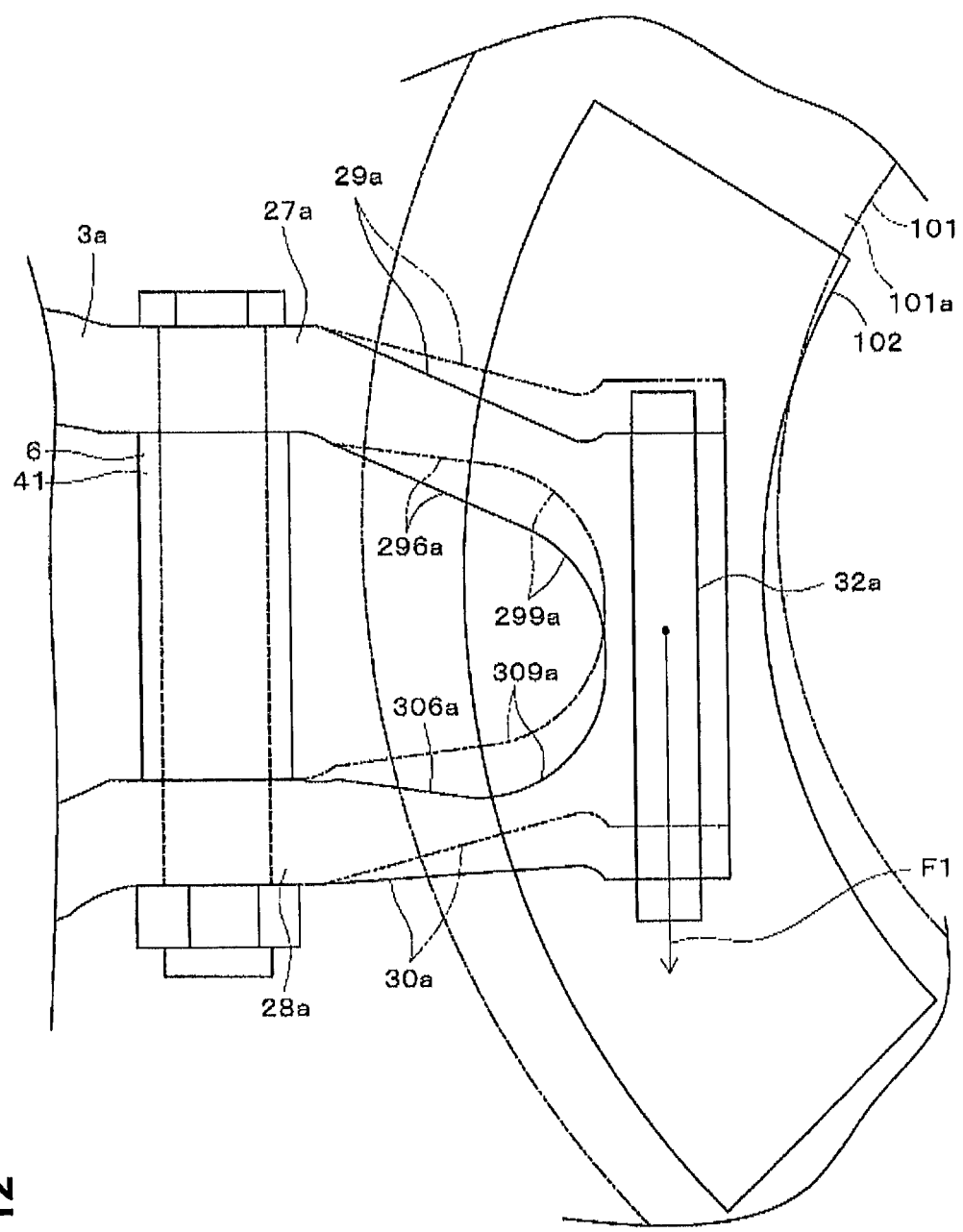
FIG. 12 is a schematic side view of a main portion illustrating the operation of the brake apparatus.

FIG. 12 is a schematic side view of a main portion illustrating the operation of the brake apparatus 1. Referring to FIG. 12, the caliper lever 3a receives a reaction force F1 from the disc 101 through the pad 102a. The reaction force F1 is generated when the disc 101 is rotated. In the present embodiment, the reaction force F1 acts on the load portion 32a of the caliper lever 3a to move downward.

Such an action of the reaction force F1 results in downward movement of the load portion 32a of the caliper lever 3a. Consequently, the load-side arms 29a, 30a flexibly warp between the load portion 32a and the fulcrum portions 27a, 28a. In FIG. 12, the double-dashed lines, which are imaginary lines, show the caliper lever 3a when reaction force F1 is not received. Also, in FIG. 12, the solid lines show the caliper lever 3a when the reaction force F1 is received.

As described above, in the caliper lever 3a, the inward surfaces 296a, 306a of the load-side arms 29a, 30a include the second curved portions 299a, 309a, respectively. This limits the occurrence of stress concentration on the parts connecting the load-side arms 29a, 30a and the load portion 32a even when the load-side arms 29a, 30a warp. In FIG. 12, the warpage amount of the caliper lever 3a is exaggerated. In this case, although not shown in FIG. 12, the caliper lever 3b at one lateral side and the caliper lever 3a at the other lateral side warp symmetrically.

As described above, in the brake apparatus 1 of the present embodiment, the load-side arms 29a, 30a of the caliper lever 3a are each inclined so that the distance between the load-side arms 29a, 30a decreases as the load portion 32a becomes closer. Additionally, the load-side arms 29a, 30a are each inclined relative to the reference plane P3. In such a structure, when applying the brakes on the railway vehicle, a reaction force, which acts on the pad 102a from the disc 101 in a direction the disc 101 rotates, acts in a generally even manner on the load-side arms 29a, 30a through the load shaft 35a and the load portion 32a. This limits stress concentration on the load-side arms 29a, 30a and the load portion 32a. Thus, the peak of the stress on the load-side arms 29a, 30a and the load portion 32a has a low value. Consequently, the load-side arms 29a, 30a each have strength sufficient to withstand the reaction force from the disc 101. Furthermore, the caliper lever 3a has sufficient strength. Additionally, since the stress, which is generated in the load-side arms 29a, 30a when applying the brakes on the railway vehicle, has a low peak, the load-side arms 29a, 30a may each be shaped in a further slim form. Such a weight reduction of the load-side arms 29a, 30a reduces the weight of the caliper lever 3a.

The caliper lever 3a and the brake apparatus 1 thus are reduced in weight and have strength sufficient to withstand the reaction force from the disc 101.

The operation and advantages of the caliper lever 3b are the same as those of the caliper lever 3a and will not be described in detail.

Additionally, in the brake apparatus 1, the edge defining the opening 20a around the load portion 32a of the caliper lever 3a is curved. In this structure, the parts connecting the load-side arms 29a, 30a and the load portion 32a may be smoothly formed, which limits stress concentration. This reduces a load on each of the load-side arms 29a, 30a.

More specifically, the inward surfaces 296a, 306a of the load-side arms 29a, 30a respectively include the second curved portions 299a, 309a, which are located so that the distance between the second curved portions 299a, 309a decreases as the load portion 32a becomes closer. In this structure, the parts connecting the load-side arms 29a, 30a and the load portion 32a may be smoothly formed, which further limits stress concentration.

In the brake apparatus 1, the inward surfaces 296a, 306a of the caliper lever 3a respectively include the flat portions 298a, 308a, which extend from the corresponding one of the second curved portions 299a, 309a toward the corresponding one of the fulcrum portions 27a, 28a. In this structure, the load-side arms 29a, 30a may be further increased in overall length. This increases the flexibility of each of the load-side arms 29a, 30a. Thus, an excessive load acting on the load-side arms 29a, 30a may be limited in a further assured manner.

In the brake apparatus 1, the load-side arms 29a, 30a are shaped to be symmetrical in the direction in which the load-side arms 29a, 30a are opposed to each other. In this structure, when the reaction force F1, which acts on the pad 102a from the disc 101 in the direction the disc 101 rotates, is transmitted to the load-side arms 29a, 30a, uneven loads on the load-side arms 29a, 30a may be limited.

This further increases the strength of the entire load-side arms 29a, 30a.

Second Embodiment

A second embodiment of the present invention will now be described. Hereafter, the description will focus on components differing from the first embodiment. Like or same reference characters are given to those components that are the same as the corresponding components of the first embodiment. Such components will not be described.

Figure 13:
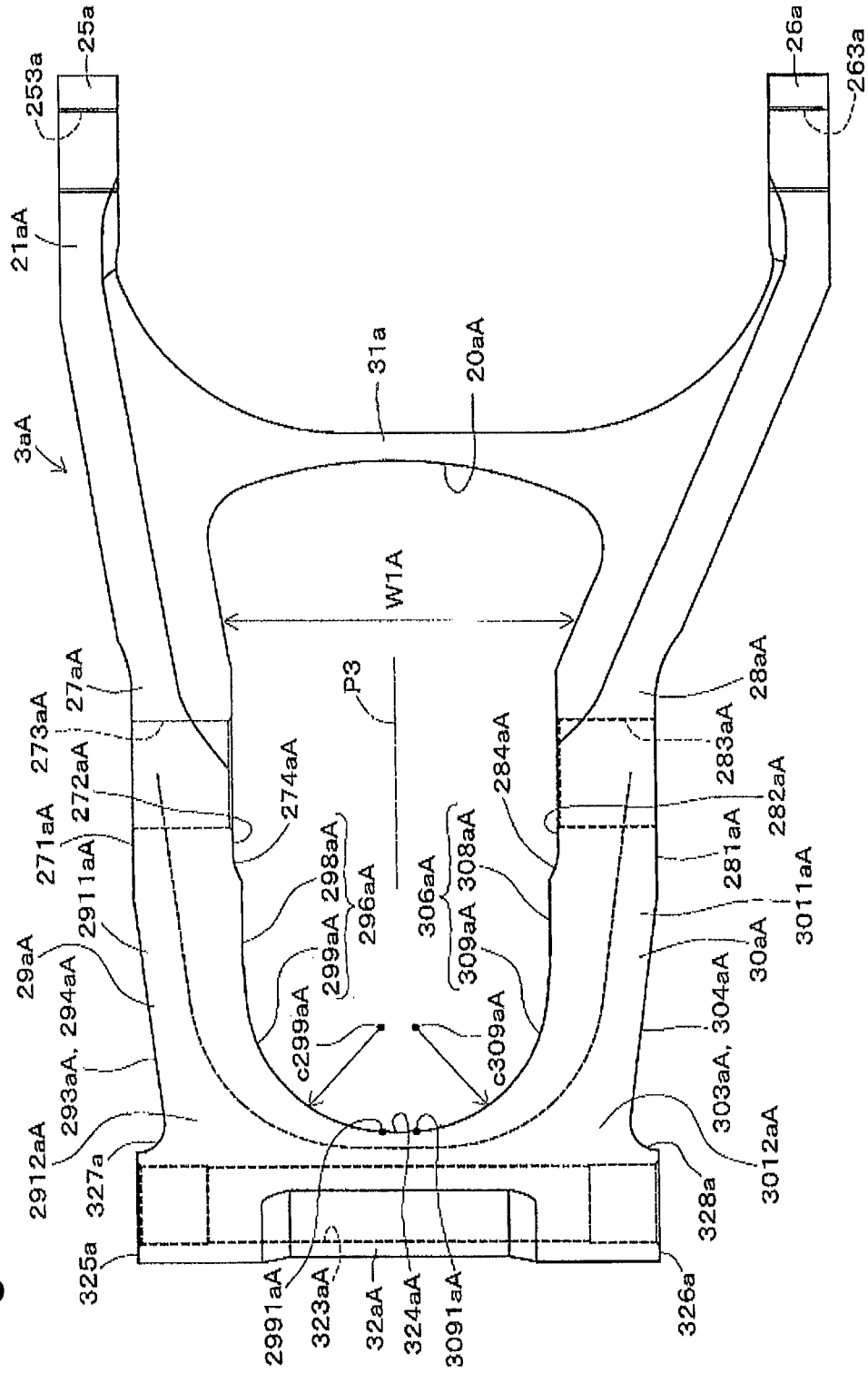
FIG. 13 is a side view of a caliper lever of a second embodiment of a brake apparatus according to the present invention showing an inner surface of the caliper lever.

FIG. 13 is a side view of a caliper lever 3aA of the second embodiment of a brake apparatus according to the present invention. FIG. 13 shows an inner surface 21aA of the caliper lever 3aA.

The caliper lever 3aA mainly differs from the caliper lever 3a in the structures of fulcrum portions 27aA, 28aA, load-side arms 29aA, 30aA, and load portions 32aA.

The fulcrum portion 27aA includes an inward surface 272aA, which includes a curved portion 274aA extending from a flat portion of the inward surface 272a toward a load portion 32. As viewed from beside, the curved portion 274aA has the form of an arc becoming lower as the load portion 32aA becomes closer. The curved portion 274aA is located below the upper surface 271a of the fulcrum portion 27a. The curved portion 274aA has a curvature center located below the inward surface 272a.

The fulcrum portion 28aA includes an inward surface 282aA, which includes a curved portion 284aA. The curved portion 284aA and the curved portion 274aA are located one above the other.

The load-side arms 29aA, 30aA each include a first end, which is continuous with the corresponding one of the fulcrum portions 27aA, 28aA.

The load-side arm 29aA is inclined and extends downward from the first end of the load-side arm 29aA toward the load portion 32aA. Also, the load-side arm 30aA is inclined and extends upward from the first end of the load-side arm 30aA toward the load portion 32aA. In this manner, the load-side arms 29aA, 30aA are inclined so that the distance between the load-side arms 29aA, 30aA decreases as the load portion 32aA becomes closer.

The upper load-side arm 29aA is symmetrical to the lower load-side arm 30aA. More specifically, the load-side arms 29aA, 30aA are shaped to be symmetrical in the direction in which the load-side arms 29aA, 30aA are opposed to each other.

The load-side arm 29aA includes an upper surface 293aA, which forms a portion of the upper surface 21aA of the caliper lever 3aA. The upper surface 293aA extends from an upper surface 271aA of the fulcrum portion 27aA.

The upper surface 293aA is formed by the flat portion 294a and inclined relative to the reference plane P3.

The load-side arm 29aA includes an inward surface 296aA, which is paired with the upper surface 293aA. The inward surface 296aA is oriented in a direction extending into the opening 20aA. Also, the inward surface 296aA and an inward surface 306aA of the load-side arm 30aA are opposed to each other. The inward surfaces 296aA, 306aA are one example of "two inner surfaces opposed to each other" of the present invention.

The inward surface 296aA includes a flat portion 298aA and a curved portion 299aA.

The flat portion 298aA extends from a first end of the curved portion 274aA of the fulcrum portion 27aA toward the load portion 32aA.

The flat portion 298aA extends from the curved portion 299aA toward the fulcrum portion 27aA. The flat portion 298aA is located below a flat portion 294aA of the upper surface 293aA. The flat portion 298aA includes a flat surface and extends parallel to the reference plane P3. In the present embodiment, in the front-rear direction, the flat portion 298aA is shorter than the flat portion 294aA. The flat portion 298aA is continuous with the curved portion 299aA.

The curved portion 299aA is arranged to limit the stress concentration around a part connecting the load-side arm 29aA and the load portion 32aA. The second curved portion 299aA is one example of "an edge defining the opening around the load portion" of the present invention. The second curved portion 299aA is arc-shaped as viewed from beside and extends downward as the load portion 32aA becomes closer. In the present embodiment, the curved portion 299aA has a curvature center c299aA, which is located below the flat portion 298aA. In the present embodiment, the second curved portion 299aA includes one end 2991aA, which is arranged beside the curvature center c299aA in the front-rear direction.

In the above structure, as viewed from beside, the load-side arm 29aA includes a part 2911aA including the flat portions 294aA, 298aA, which are located one above the other. The part 2911aA is tapered toward the load portion 32aA. Additionally, as viewed from beside, the load-side arm 29aA includes a part 2912aA, which is located above the curved portion 299aA and continuous with the load portion 32aA.

The load-side arm 30aA is located below the load-side arm 29aA, which has the structure described above.

As described above, the lower load-side arm 30aA is shaped to be symmetrical to the upper load-side arm 29aA. More specifically, the load-side arms 29aA, 30aA are symmetrical in shape in a direction the load-side arms 29aA, 30aA are opposed to each other. Thus, the load-side arm 30aA will be briefly described.

More specifically, the load-side arm 30aA includes a lower surface 303aA and an inward surface 306aA. The lower surface 303aA and the inward surface 306aA are shaped to be symmetrical to the upper surface 293aA and the inward surface 296aA, which are located above the lower surface 303aA and the inward surface 306aA.

The inward surface 306aA includes a flat portion 308aA and a curved portion 309aA. The flat portion 308aA and the curved portion 309aA are shaped to be symmetrical to the flat portion 298aA and the curved portion 299aA, which are located above the flat portion 308aA and the curved portion 309aA. The curved portion 309aA of the inward surface 306aA is arranged so that the distance from the curved portion 299aA decreases as the load portion 32aA becomes closer. The curved portions 299aA, 309aA are one example of "two arcs" of the present invention.

The load-side arms 29aA, 30aA (e.g., flat portions 294aA, 304aA) are inclined so as to become closer to each other as the load portion 32aA becomes closer. Additionally, the load-side arms 29aA, 30aA (e.g., flat portions 294aA, 304aA) are each inclined relative to the reference plane P3.

The load-side arms 29aA, 30aA each includes a second end, which are connected by the load portion 32aA.

The load portion 32aA includes an inward surface 324aA, which is oriented in the direction extending into the opening 20aA. The inward surface 324aA functions as a part connecting the curved portions 299aA, 309aA of the load-side arms 29aA, 30aA. The inward surface 324aA is shaped to be symmetrical about the reference plane P3. In the present embodiment, the inward surface 324aA is orthogonal to the reference plane P3. The inward surface 324aA includes an upper end, which is continuous with the end 2991aA of the curved portion 299aA. The inward surface 324aA includes a lower end, which is continuous with one end 3091aA of the curved portion 309aA.

The upper surface 325a of the load portion 32aA is continuous with a curved portion 327aA formed in the load portion 32aA. The curved portion 327a smoothly forms a part connecting the load-side arm 29aA and the load portion 32aA. The curved portion 327aA includes a curved surface that is recessed downward. Also, the load portion 32aA includes a lower surface 326aA, which is flat and extends parallel to the reference plane P3. The lower surface 326aA is continuous with a curved portion 328aA formed in the load portion 32aA.

In the above structure, the opening 20aA has W1A that is constant between the flat portions 298aA, 308aA of the load-side arms 29aA, 30aA.

When using the caliper lever 3aA, the caliper lever 3b is replaced by a caliper lever (not shown) that is bilaterally symmetrical to the caliper lever 3aA.

The second embodiment has the same advantages as the first embodiment.

Third Embodiment

Figure 14:
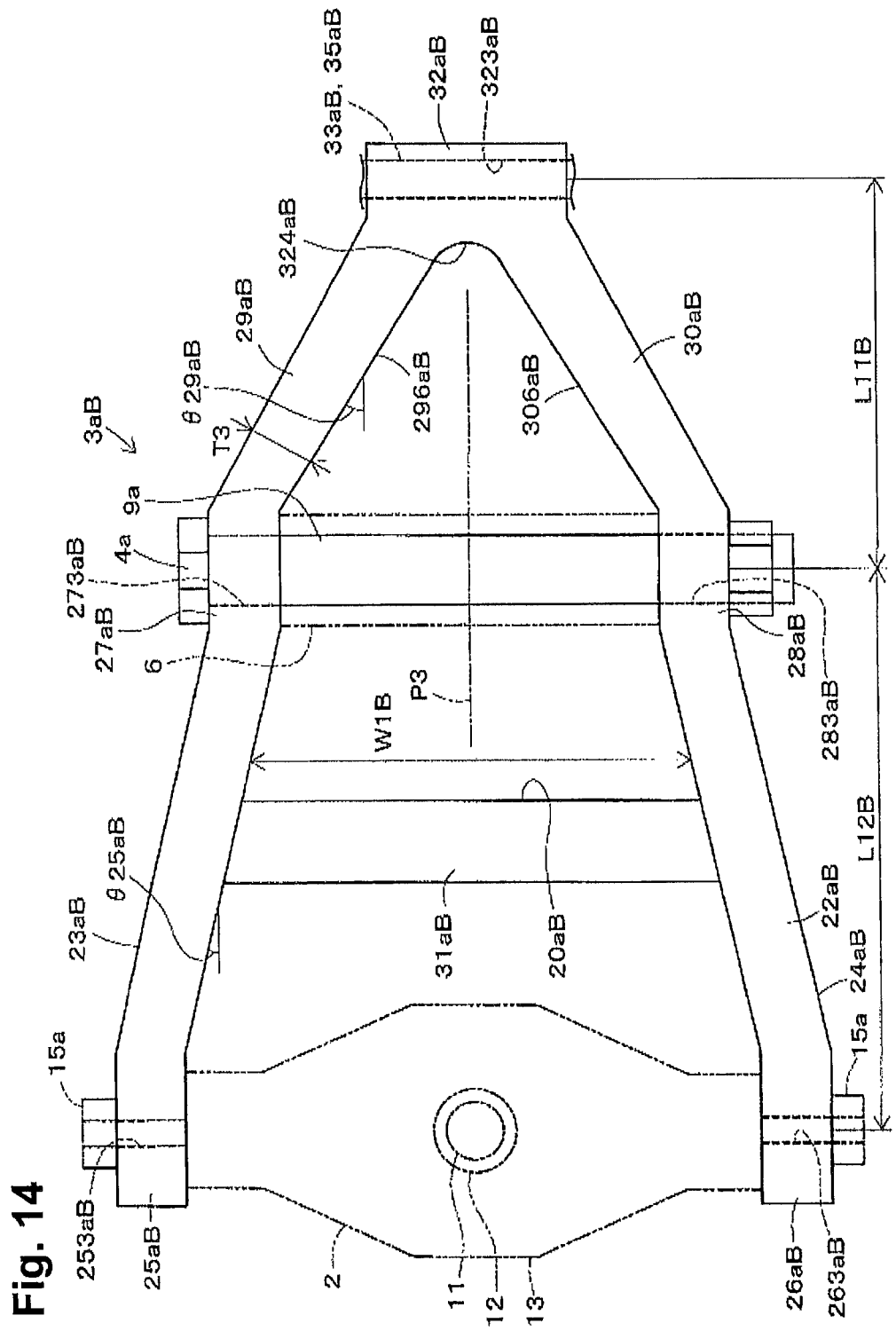
FIG. 14 is a side view of a main portion of a third embodiment of a railway vehicle disc brake apparatus according to the present invention.

A third embodiment of the present invention will now be described. FIG. 14 is a side view of the third embodiment of a railway vehicle disc brake apparatus according to the present invention. More specifically, FIG. 14 is a side view of a caliper lever 3aB showing an outer surface 22aB of the caliper lever 3aB.

Referring to FIG. 14, the third embodiment includes the caliper lever 3aB instead of the caliper lever 3a.

The caliper lever 3aB pivots about the fulcrum shaft 9a of the fulcrum shaft member 4a. In the present embodiment, the caliper lever 3aB is a metal formed by casting, forging, sintering, or other manufacturing processes. In the present embodiment, the caliper lever 3aB is a solid member and includes no inner cavity other than a through hole.

In the present embodiment, as viewed from beside, the caliper lever 3aB is generally A-shaped and symmetrical at the upper side and the lower side.

The caliper lever 3aB includes two effort-side arms 25aB, 26aB located one above the other, two fulcrum portions 27aB, 28aB located one above the other, two load-side arms 29aB, 30aB located one above the other, a connector 31aB, and a load portion 32aB.

Each component of the caliper lever 3aB is shaped to be, for example, elliptical in a cross-section orthogonal to the direction in which the component extends.

The effort-side arms 25aB, 26aB are each coupled to the cylinder device 2. The effort-side arm 25aB is located above the effort-side arm 26aB. The effort-side arms 25aB, 26aB each include a first end, in the front-rear direction, that defines a first end, in the front-rear direction, of the caliper lever 3aB. The first ends of the effort-side arms 25aB, 26aB respectively include through holes 253aB, 263aB extending in the vertical direction. The through holes 253aB, 263aB respectively receive the threaded members 15a, 15a, which have been described above.

The effort-side arms 25aB includes an intermediate portion and a second end in the front-rear direction that are inclined downward so as to become lower as the first end of the effort-side arm 25aB becomes farther. In contrast, the effort-side arm 26aB includes an intermediate portion and a second end in the longitudinal direction that are inclined upward so as to become higher as the first end of the effort-side arm 26aB becomes farther. In the present embodiment, the angle (inclination angle) formed by the horizontal plane and the intermediate portion and the second end of the effort-side arm 26aB is set to be the same as the inclination angle of the intermediate portion and the second end of the effort-side arm 25aB.

The intermediate portions of the effort-side arms 25aB, 26aB, which have the structure described above, are connected by the connector 31aB extending vertically.

The connector 31aB, the effort-side arms 25aB, 26aB, the fulcrum portions 27aB, 28aB, the load-side arms 29aB, 30aB, and the load portion 32aB define an opening 20aB. As viewed from beside, the opening 20aB is shaped to be elongated in the front-rear direction.

The opening 20aB has a width W1B in the vertical direction that decreases in a stepped manner from the connector 31aB toward the load portion 32aB. More specifically, in the effort-side arms 25aB, 26aB, the width W1B continuously decreases as the load portion 32aB becomes closer. In the fulcrum portions 27aB, 28aB, the width W1B is generally constant. In the load-side arms 29aB, 30aB, the width W1B continuously decreases as the load portion 32aB becomes closer. Around the load-side arms 29aB, 30aB and the load portion 32aB, the opening 20aB is triangular and converges (tapers) toward the load portion 32aB.

The fulcrum portions 27aB, 28aB respectively extend from the effort-side arms 25aB, 26aB and are coupled to the fulcrum shaft member 4a. The fulcrum portions 27aB, 28aB are each block-shaped. The fulcrum portion 27aB is located above the fulcrum portion 28aB. The fulcrum portion 27aB is continuous with the effort-side arm 25aB and the load-side arm 29aB. In the same manner, the fulcrum portion 28aB is continuous with the effort-side arm 26aB and the load-side arm 30aB.

The fulcrum portions 27aB, 28aB respectively include through holes 273aB, 283aB extending vertically. The fulcrum shaft member 4a is inserted into the through holes 273aB, 283aB. The fulcrum portions 27aB, 28aB are respectively continuous with the load-side arms 29aB, 30aB, which are located one above the other.

As viewed from beside, the load-side arms 29aB, 30aB are V-shaped as a whole. The load-side arms 29aB, 30aB are shaped to be branched from the load portion 32aB.

The load-side arm 29aB is inclined and extends downward from the first end of the load-side arm 29aB toward the load portion 32aB. Also, the load-side arm 30aB is inclined and extends upward from the first end of the load-side arm 30aB toward the load portion 32aB. In this manner, the load-side arms 29aB, 30aB are inclined so that the distance between the load-side arms 29aB, 30aB decreases as the load portion 32aB becomes closer.

In the present embodiment, as viewed from beside, an angle θ29aB between the horizontal plane and the load-side arm 29aB is larger than an angle θ25aB between the horizontal plane and the intermediate portion and the second end of the effort-side arm 25aB (θ29aB>θ25aB). In this manner, the inclination angles of the load-side arms 29aB, 30aB are set to be relatively lager. Consequently, the load-side arms 29aB, 30aB, the fulcrum shaft member 4a, and the load portion 32aB form a triangular truss structure. In the present embodiment, the truss structure is generally equilateral triangular.

In the present embodiment, the angle θ29aB is formed by the horizontal plane and the inward surface 296aB of the load-side arm 29aB. The angle θ25aB is formed by the horizontal plane and the inward surface of the intermediate portion of the effort-side arm 25a.

As viewed from beside, the load-side arm 29aB has a thickness T3 that is constant.

The load-side arm 30aB is located below the load-side arm 29aB, which has the structure described above.

As described above, the load-side arm 30aB is shaped to be symmetrical to the load-side arm 29aB, which is located above the load-side arm 30aB. That is, the load-side arms 29aB, 30aB are symmetrical in shape in the direction in which the load-side arms 29aB, 30aB are opposed to each other. Thus, the load-side arm 30aB will not be described in detail.

The load-side arms 29aB, 30aB are inclined so that the distance between the load-side arms 29aB, 30aB decreases as the load portion 32aB becomes closer. Additionally, the load-side arms 29aB, 30aB are each inclined relative to the reference plane P3.

The load-side arms 29aB, 30aB each include a second end. The second ends of the load-side arms 29aB, 30aB are connected to each other by the load portion 32aB.

The load portion 32aB is configured to hold the pad holder 5a (not shown in FIG. 14). The load portion 32aB defines a second end, in the front-rear direction, of the caliper lever 3aB. The load portion 32aB is tubular and extends vertically. The load portion 32aB includes an upper part, which is continuous with the second end of the load-side arm 29aB and includes a through hole 323aB. The reference plane P3 extends orthogonal to the axis of the through hole 323aB (load shaft 35a). The reference plane P3 extends through the center of the caliper lever 3aB in the vertical direction.

In the front-rear direction, the load-side arms 29aB, 30aB is set to be shorter than the effort-side arms 25aB, 26aB in overall length. In the present embodiment, in the front-rear direction, the length L11B from the center of the through hole 273aB of the fulcrum portion 27aB to the center of the through hole 323aB of the load portion 32aB is less than the length L12B from the center of the through hole 273aB to the center of the through hole 253aB of the effort-side arm 25aB (L11B<L12B).

The load portion 32aB includes an inward surface 324aB oriented in a direction extending into the opening 20aB. The inward surface 324aB connects the inward surfaces 296aB, 306aB of the load-side arms 29aB, 30aB. The inward surface 324aB is shaped to be symmetrical about the reference plane P3. In the present embodiment, as viewed from beside, the inward surface 324aB is arc-shaped. The inward surface 324aB includes an upper end, which is continuous with the inward surface 296aB. The inward surface 324aB includes a lower end, which is continuous with the inward surface 306aB.

The load shaft member 33a is inserted into the through hole 323a of the load portion 32aB. The load shaft member 33a supports the pad holder 5a (not shown in FIG. 14) on the load portion 32aB.

The structure of the caliper lever 3aB has been described. In the present embodiment, the caliper lever 3b is replaced by a caliper lever (not shown) that is similar to the caliper lever 3aB. The caliper lever is bilaterally symmetrical to the caliper lever 3aB and will not be described in detail. Although not shown in the drawings, the caliper lever is connected to the cylinder device 2, the fulcrum shaft member 4b, and a load shaft member 33b, which is the same structure as the caliper lever 3b.

Figure 15:
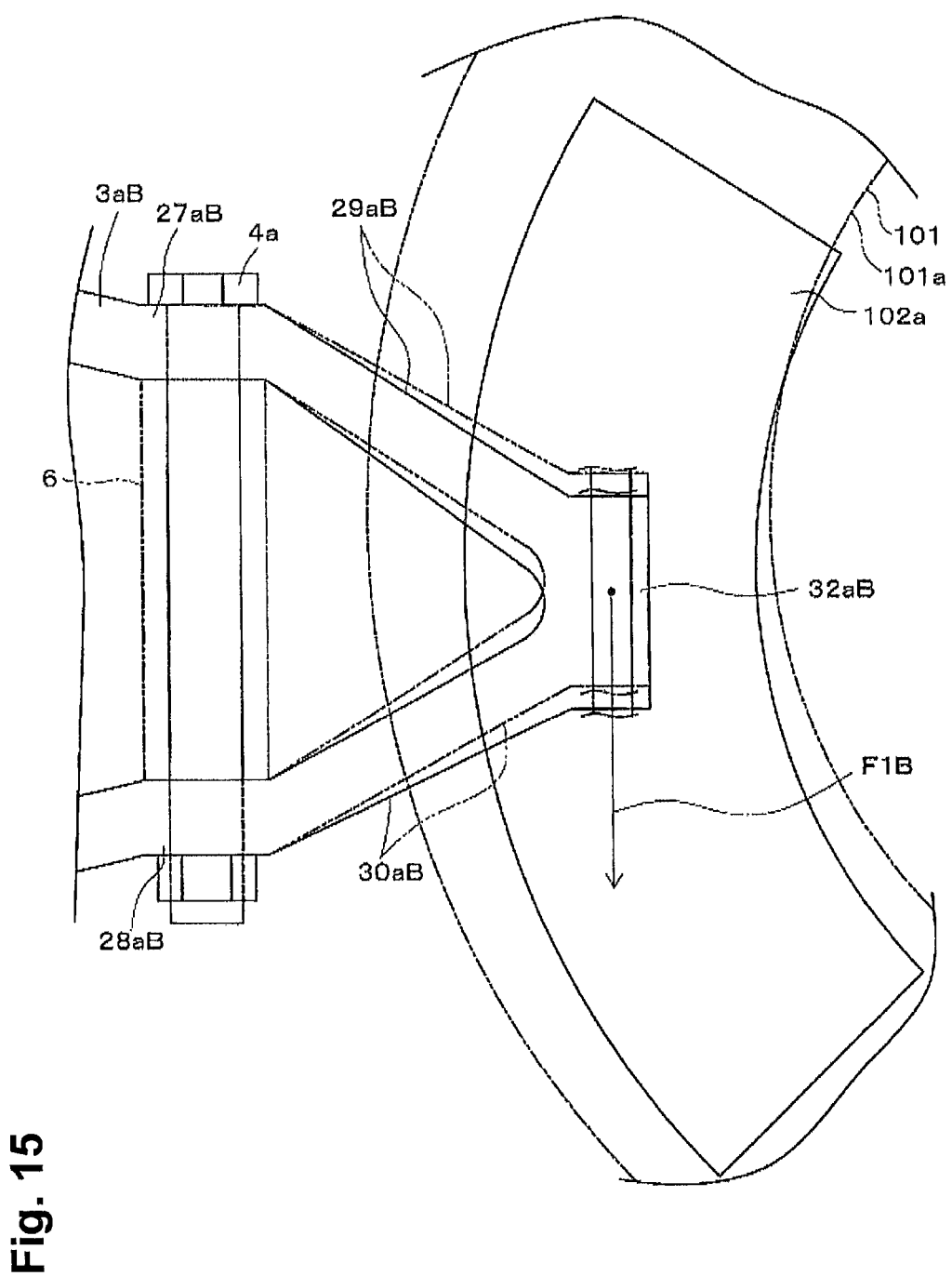
FIG. 15 is a schematic side view of a main portion illustrating the operation of the railway vehicle disc brake apparatus of the third embodiment according to the present invention.

FIG. 15 is a schematic side view of a main portion illustrating the operation of the railway vehicle disc brake apparatus of the third embodiment according to the present invention. Referring to FIG. 15, the caliper lever 3aB receives a reaction force F1B from the disc 101 through the pad 102a and the like. The reaction force F1B is generated when the disc 101 is rotated, and acts on the load portion 32aB of the caliper lever 3aB to move downward. Such an action of the reaction force F1B results in downward movement of the load portion 32aB of the caliper lever 3aB.

However, the truss structure, which is formed by the fulcrum shaft member 4a, the load-side arms 29aB, 30aB, and the load portion 32aB, limits the deformation amount of the load-side arms 29aB, 30aB in the direction of the reaction force F1B.

Thus, the stress concentration on the load-side arms 29aB, 30aB may be limited. In FIG. 15, the double-dashed lines, which are imaginary lines, show the caliper lever 3aB when reaction force F1B is not received. Also, in FIG. 15, the solid lines show the caliper lever 3aB when the reaction force F1B is received. In FIG. 15, the warpage amount of the caliper lever 3aB is exaggerated. In this case, although not shown in the drawings, a caliper lever, which is located at a side opposite to the caliper lever 3aB, and the caliper lever 3aB deform symmetrically.

As described above, the load-side arms 29aB, 30aB are inclined so that the distance between the load-side arms 29aB, 30aB decreases as the load portion 32aB becomes closer. Additionally, the load-side arms 29aB, 30aB are each inclined relative to the reference plane P3. In this structure, when applying the brakes on the railway vehicle, a reaction force, which acts on the pad 102a from the disc 101 in the direction the disc 101 rotates, acts in a generally even manner on the load-side arms 29aB, 30aB through the load shaft 35a and the load portion 32aB. This limits stress concentration on the load-side arms 29aB, 30aB and the load portion 32aB. Thus, the peak of the stress on the load-side arms 29aB, 30aB and the load portion 32aB has a low value. Consequently, each of the load-side arms 29aB, 30aB has strength sufficient to withstand the reaction force from the disc 101. Furthermore, the caliper lever 3aB has sufficient strength. Additionally, since the stress, which is generated in the load-side arms 29a, 30a when applying the brakes on the railway vehicle, has a low peak, the load-side arms 29aB, 30aB may each be shaped in a further slim form. Such a weight reduction of the load-side arms 29aB, 30aB reduces the weight of the caliper lever 3aB.

Thus, the brake apparatus is reduced in weight and has strength sufficient to withstand the reaction force from the disc 101.

Additionally, as viewed from beside, the opening 20aB of the caliper lever 3aB is triangular and converges (tapers) toward the load portion 32aB. In this configuration, the fulcrum shaft 9a, the load-side arms 29aB, 30aB, and the load portion 32aB form a triangular truss structure. This further increases the rigidity of the load-side arms 29aB, 30aB. For example, when the reaction force F1B, which acts on the pad 102a from the disc 101 in the direction the disc 101 rotates, is transmitted to the load-side arms 29aB, 30aB, deformations of the load-side arms 29aB, 30aB may be limited. This limits stress concentration resulting from such deformations of the load-side arms 29aB, 30aB.

Although the embodiment of the present invention has been described, the present invention is not limited to the above embodiment and may be embodied in many other specific forms within the scope and equivalence of the appended claims. For example, the embodiment may be modified as follows.

(1) In each of the above embodiments, the inclination angle of each load-side arm may be larger or smaller than the value shown in the drawing of the embodiment.

(2) In the first and second embodiments, each arm of each caliper lever has an L-shaped cross-section orthogonal to the direction in which the arm extends. However, there is no limit to such a shape. For example, each arm may have any cross-sectional shape orthogonal to the direction in which the arm extends and thus may have, for example, an elliptical cross-section.

(3) In each of the above embodiments, two load-side arms are symmetrical in the direction in which the load-side arms are opposed to each other. However, there is no limit to such a configuration. For example, two load-side arms may be shaped to be asymmetrical in the direction in which the load-side arms are opposed to each other.

(4) In each of the above embodiments, the caliper levers are each formed by a solid member. However, the caliper lever may be partially or entirely formed by a hollow member. In this case, the caliper lever may be further reduced in weight while having strength. Additionally, in the same manner, the lever support member may be formed by a hollow member.

(5) In each of the above embodiments, the reaction force F1 is shown in a downward direction. However, the reaction force F1 is reversed to an upward direction depending on the direction in which the vehicle travels. Even in this case, the present invention is applicable because the inward surfaces, which are located one above the other, of each arm are symmetrical.

INDUSTRIAL APPLICABILITY

The present invention is widely applicable to a railway vehicle disc brake apparatus.

DESCRIPTION OF REFERENCE CHARACTERS 1 railway vehicle disc brake apparatus
2 cylinder device (drive device)
3a, 3b, 3aA, 3aB caliper lever
9a, 9b fulcrum shaft
25a, 25b, 26a, 26b, 25aA, 26aA, 25aB, 26aB effort-side arm
27a, 28a, 27b, 28b, 27aA, 28aA, 27aB, 28aB fulcrum portion
29a, 30a, 29b, 30b, 29aA, 30aA, 29aB, 30aB load-side arm
32a, 32b, 32aA, 32aB load portion
35a load shaft
101 disc
102a, 102b pad
P3 reference plane

The invention claimed is:
1. A railway vehicle disc brake apparatus comprising:
a caliper lever configured to be pivotal about a predetermined fulcrum shaft in an inward pivotal direction and an outward pivotal direction so that a pad is movable in the inward pivotal direction moving toward a disc and in the outward pivotal direction moving away from the disc; and
a drive device that drives the caliper lever about the fulcrum shaft,
wherein the caliper lever includes
an effort-side arm coupled to the drive device,
a fulcrum portion that extends from the effort-side arm and is coupled to the fulcrum shaft,
two load-side arms that extend from the fulcrum portion, and
a load portion that connects the two load-side arms to each other and holds the pad with a predetermined load shaft, wherein the two load-side arms of the caliper lever are inclined so that a distance between the two load-side arms decreases as the load portion of the caliper lever becomes closer,
wherein each of the two load-side arms of the caliper lever is inclined relative to a reference plane that is orthogonal to a direction in which the load portion of the caliper lever extends,
wherein the load portion of the caliper lever includes a fulcrum portion side, an outer surface of which is an opposite side relative to the pad, and a recess continuous with and recessed from the outer surface of the fulcrum portion side of the load portion in the inward pivotal direction of the caliper lever, the recess being arc-shaped and curved in a direction extending from the fulcrum portion to the load portion as viewed from beside the caliper lever in a direction orthogonal to a direction in which the predetermined fulcrum shaft extends, the recess including a bottom portion facing outward in the outward pivotal direction of the caliper lever.

2. The railway vehicle disc brake apparatus according to claim 1, wherein the caliper lever includes an opening surrounded by the two load-side arms and the load portion, and an edge defining the opening includes a curved portion around the load portion.

3. The railway vehicle disc brake apparatus according to claim 2, wherein the two load-side arms respectively include two inward surfaces opposed to each other, and the two inward surfaces respectively include two arcs arranged so that a distance between the two arcs decreases as the load portion becomes closer.

4. The railway vehicle disc brake apparatus according to claim 3, wherein the inward surfaces further respectively include flat portions that extend from the two arcs toward the fulcrum portion.

5. The railway vehicle disc brake apparatus according to claim 1, wherein the caliper lever includes an opening surrounded by the two load-side arms and the load portion, and the opening is shaped to be triangular and tapered toward the load portion.

6. The railway vehicle disc brake apparatus according to claim 1, wherein the two load-side arms are symmetrical in shape in a direction in which the two load-side arms are opposed to each other.

7. The railway vehicle disc brake apparatus according to claim 1, wherein the arc-shaped recess of the load portion is arranged between the two load-side arms in an axial direction of the predetermined load shaft.

8. The railway vehicle disc brake apparatus according to claim 1, wherein the arc-shaped recess of the load portion continuously extends between the two load-side arms.

9. The railway vehicle disc brake apparatus according to claim 1, wherein the two load-side arms are connected to the fulcrum portion side of the load portion, respectively,
wherein each of the two load-side arms includes a first plate and a second plate, the first plate and the second plate of each of the load-side arms extend and intersect each other in a cross-section that is orthogonal to a direction in which the respective load-side arm extends such that each of the two load-side arms includes an L-shaped cross section,
wherein, for each of the two load-side arms, the second plate protrudes from the first plate to respective outer surfaces of the load-side arms that are facing outwardly away from the pad, and wherein the first plate of each load-side arm has non-uniform thickness as measured in a direction that is orthogonal to the direction in which the predetermined fulcrum shaft extends and orthogonal to the direction in which the load-side arm extends and the first plate of each load-side arm is thicker at a fulcrum portion side of the first plate and is thinner at a load portion side of the first plate.

10. The railway vehicle disc brake apparatus according to claim 1, wherein the recess is a bottomed recess, and wherein the bottom portion which forms the bottomed recess faces outward in the outward pivotal direction of the caliper lever.

\* \* \* \* \*